(12) United States Patent
Linde

(10) Patent No.: US 11,305,401 B2
(45) Date of Patent: Apr. 19, 2022

(54) WATER-ABRASIVE-SUSPENSION CUTTING SYSTEM

(71) Applicant: ANT Applied New Technologies AG, Lübeck (DE)

(72) Inventor: Marco Linde, Lübeck (DE)

(73) Assignee: ANT APPLIED NEW TECHNOLOGIES AG, Lübeck (DE)

( * ) Notice: Subject to any disclaimer, the term of this patent is extended or adjusted under 35 U.S.C. 154(b) by 62 days.

(21) Appl. No.: 16/498,744

(22) PCT Filed: Mar. 31, 2017

(86) PCT No.: PCT/EP2017/057783
§ 371 (c)(1),
(2) Date: Sep. 27, 2019

(87) PCT Pub. No.: WO2018/177556
PCT Pub. Date: Oct. 4, 2018

(65) Prior Publication Data
US 2021/0107114 A1    Apr. 15, 2021

(51) Int. Cl.
*B24C 1/04* (2006.01)
*B24C 7/00* (2006.01)
(Continued)

(52) U.S. Cl.
CPC ............ *B24C 1/045* (2013.01); *B24C 7/0007* (2013.01); *F16K 5/201* (2013.01); *F16K 11/087* (2013.01);
(Continued)

(58) Field of Classification Search
CPC ....... B24C 7/0007; B24C 7/003; B24C 1/045; F16K 5/0626; F16K 5/0636;
(Continued)

(56) References Cited

U.S. PATENT DOCUMENTS 3,605,789 A * 9/1971 Graham .................. F16K 5/205
137/240
3,731,560 A * 5/1973 Bares ...................... B25B 13/02
81/176.15
(Continued)

FOREIGN PATENT DOCUMENTS

CA     2 944 227 A1    10/2015
CN     102401148 A *    4/2012
(Continued)

*Primary Examiner* — David Colon-Morales
(74) *Attorney, Agent, or Firm* — McGlew and Tuttle, P.C.

(57) ABSTRACT

A water-abrasive suspension cutting facility includes a pressure tank (11) for providing a water-abrasive agent suspension (13) which is under pressure, a lock chamber (21), and a refilling valve for refilling abrasive agent into the pressure tank via the lock chamber (21). The refilling valve (21) includes a valve entry (49), a valve exit (51), a valve space (71) which is arranged between the valve entry (49) and the valve exit (51), and a valve body (67) which is located in the valve space (71). The valve entry (49) is connected to the lock chamber (21) and the valve exit (51) to the pressure tank (11). The refilling valve (19) can assume a first closure position, a first open position and a second open position. In the first closure position the lock chamber (21) is fluid-separated from the pressure tank.

20 Claims, 19 Drawing Sheets

(51) Int. Cl.
*F16K 11/087* (2006.01)
*F16K 5/20* (2006.01)
*F16K 27/06* (2006.01)
*F16K 31/04* (2006.01)

(52) U.S. Cl.
CPC ........ *F16K 11/0873* (2013.01); *F16K 27/067* (2013.01); *F16K 31/042* (2013.01)

(58) Field of Classification Search
CPC .......... F16K 5/0642; F16K 5/201; F16K 5/20; F16K 11/0873; F16K 11/087; F16K 27/067; F16K 31/042
See application file for complete search history.

(56) References Cited

U.S. PATENT DOCUMENTS

| | | | | |
|---|---|---|---|---|
| 4,203,460 A | * | 5/1980 | Priese | F16K 5/0647 137/240 |
| 4,262,688 A | | 4/1981 | Bialkowski | |
| 4,723,387 A | * | 2/1988 | Krasnoff | B24C 1/045 406/109 |
| 4,816,987 A | * | 3/1989 | Brooks | F16K 31/046 137/487.5 |
| 4,932,436 A | * | 6/1990 | Kanemaru | F16K 5/0605 137/596 |
| 5,169,123 A | | 12/1992 | Martin et al. | |
| 5,285,809 A | * | 2/1994 | Shimoguri | F04B 39/16 137/203 |
| 5,594,175 A | * | 1/1997 | Lyon | F16K 37/0083 73/593 |
| 5,643,058 A | * | 7/1997 | Erichsen | B24C 1/045 451/100 |
| 5,722,801 A | | 3/1998 | Mahoney, Jr. | |
| 5,842,683 A | * | 12/1998 | Wei | F16K 27/067 251/315.13 |
| 6,050,289 A | | 4/2000 | Flores-Verdugo et al. | |
| 6,279,870 B1 | * | 8/2001 | Welz, Jr. | F23N 1/025 251/129.04 |
| 6,578,598 B2 | * | 6/2003 | Gardner | F16K 5/0605 137/240 |
| 6,669,171 B1 | * | 12/2003 | Stunkard | F16K 5/0642 251/315.08 |
| 6,857,944 B2 | * | 2/2005 | Linde | B24C 7/0007 451/38 |
| 7,013,917 B2 | * | 3/2006 | Joseph, III | F16K 5/0605 137/624.13 |
| 7,089,960 B2 | * | 8/2006 | Maruta | F16K 5/0605 137/625.22 |
| 8,881,767 B2 | * | 11/2014 | Bartell | F16K 11/0873 137/625.32 |
| 9,086,335 B2 | * | 7/2015 | Dolenti | G01M 15/046 |
| 9,366,347 B2 | * | 6/2016 | Diehl | F16K 11/10 |
| 9,586,306 B2 | * | 3/2017 | Zhang | G01L 13/00 |
| 9,822,887 B2 | * | 11/2017 | Klein | F16K 5/20 |
| 2003/0006729 A1 | * | 1/2003 | Raymond | F16K 31/042 318/687 |
| 2004/0206404 A1 | * | 10/2004 | Yang | F16K 5/0605 137/614.17 |
| 2009/0032762 A1 | * | 2/2009 | Junier | F16K 5/0605 251/315.16 |
| 2009/0095931 A1 | * | 4/2009 | Stunkard | F16K 27/067 251/174 |
| 2014/0299806 A1 | * | 10/2014 | Hoffmann | F16K 5/0605 251/283 |
| 2015/0031270 A1 | * | 1/2015 | Miller | B24C 7/0023 451/2 |
| 2016/0339560 A1 | | 11/2016 | Hashish et al. | |

FOREIGN PATENT DOCUMENTS

| | | | |
|---|---|---|---|
| CN | 102401148 A | 4/2012 | |
| CN | 102777622 A | 11/2012 | |
| CN | 202580104 U | 12/2012 | |
| CN | 104633168 A | 5/2015 | |
| CN | 105036310 A | 11/2015 | |
| CN | 106163742 A | 11/2016 | |
| DE | 69722383 T2 | 3/2004 | |
| DE | 10 2011 101074 A1 | 11/2012 | |
| DE | 102011101074 A1 * | 11/2012 | .......... F16K 31/041 |
| EP | 0 276 219 B1 | 4/1990 | |
| EP | 1 199 136 A1 | 4/2002 | |
| EP | 1 859 901 A1 | 11/2007 | |
| EP | 2038088 B1 | 1/2008 | |
| EP | 2 755 802 B1 | 4/2016 | |
| JP | 60260774 A | 12/1985 | |
| JP | 2001-165335 A | 6/2001 | |
| JP | 2001248739 A | 9/2001 | |
| JP | 2015-113946 A | 6/2015 | |
| WO | 2008001111 A1 | 1/2008 | |
| WO | 2010/115624 A1 | 10/2010 | |
| WO | 2015/149867 A1 | 10/2015 | |
| WO | WO-2015149867 A1 * | 10/2015 | .......... B24C 7/0007 |

* cited by examiner

WATER-ABRASIVE-SUSPENSION CUTTING SYSTEM

CROSS REFERENCE TO RELATED APPLICATIONS

This application is a United States National Phase Application of International Application PCT/EP2017/057783 filed Mar. 31, 2017, the entire contents of which are incorporated herein by reference.

FIELD OF THE INVENTION

The present disclosure relates to a water-abrasive suspension cutting facility.

BACKGROUND OF THE INVENTION

Water-abrasive suspension cutting facilities are used for cutting materials by way of a high-pressure water jet, to which an abrasive agent is added. Water-abrasive suspension cutting facilities are to be differentiated from water-abrasive injection cutting facilities, concerning which the abrasive agent is not introduced into the already greatly accelerated water until or at an exit nozzle. Concerning water-abrasive suspension cutting facilities, the water which is at a high pressure is firstly mixed with the abrasive agent and the water-abrasive suspension is then accelerated in the exit nozzle. With regard to water-abrasive injection cutting facilities, although there is not the problem of mixing the abrasive agent with the water at a high pressure since the abrasive agent is not fed until at the exit nozzle, the abrasive agent-water ratio however is very limited with regard to water-abrasive injection cutting facilities and herewith its cutting force. Furthermore, in the case of water-abrasive injection cutting facilities, entrapped air leads to a reduction of the cutting performance due to the ineffective acceleration of the abrasive agent particles on being sucked into the water jet, as well as to high air components in the cutting jet. In contrast, with water-abrasive suspension cutting facilities, the abrasive agent-water ratio can be selected higher and a higher cutting force can be achieved since the water is mixed with the abrasive agent in a controlled manner and at high pressure upstream of the exit nozzle without entrapped air. Thus for example a part of the water flow can be led through an abrasive agent container which is designed as a pressure tank. Such a facility is known from EP 1 199 136. With regard to these facilities, the refilling of the abrasive agent is a technical challenge, since for this the facility must be taken out of operation, the abrasive agent container must be brought into a pressureless state and only then can it be filled. However, in the case of industrial applications a continuous cutting is often desired, with regard to which the facility does not need to be taken out of operation for filling the abrasive agent.

EP 2 755 802 B1 and WO 2015/149867A1 describe lock solutions, in order to ensure a continuous operation of the facility. Due to the particularly high pressures to some extent above 2000 bar, the reliable opening and closing of such lock solutions however is somewhat of a technical challenge. The abrasive agent can also clog and/or block lock valves.

SUMMARY OF THE INVENTION

The water-abrasive suspension cutting facility according to the present invention and which is disclosed herein, compared to the aforementioned solutions has the advantage that the lock valves do not clog or block and can be opened and closed in a reliable manner, in order to ensure a continuous operation of the facility. Advantageous embodiments of the disclosure are specified in the dependent claims, the subsequent description and the drawings.

The water-abrasive suspension cutting facility which is disclosed herein comprises a pressure tank for providing a water-abrasive agent suspension which is under pressure, a lock chamber and a refilling valve for refilling abrasive agent into the pressure tank via the lock chamber. The refilling valve herein comprises a valve entry, a valve exit, a valve space which is arranged between the valve entry and the valve exit, and a valve body which is located in the valve space, wherein the valve entry is connected to the lock chamber and the valve exit to the pressure tank.

The reliable opening and closing of the refilling valve is now ensured by way of four aspects of this disclosure, which each on its own or in an arbitrary combination of two, three or all four aspects contribute to the refilling valve not clogging or being blocked by the abrasive agent.

According to the first aspect, the refilling valve can assume a first closure position, a first open position and a second open position, wherein in the first closure position the lock chamber is fluid-separated from the pressure tank and in the first as well as a second open position the lock chamber is fluid-connected to the pressure tank. Preferably, the closure position lies between the first open position and the second open position. Herewith, there are two possibilities for the movement direction of the valve body, either of opening the valve towards the first open position or towards the second open position. If therefore one movement direction is clogged or blocked, then the valve body can be moved in the other movement direction and the valve can be brought into the other open position. As long as the torque does not exceed a certain threshold, the valve however can also be actuated exclusively in one direction.

According to the second aspect, the valve space can be pressurized in the closure position of the valve body. For this, the valve space comprise as pressure inlet, via which the valve space can be pressurized in a closure position of the valve body. On starting operation of the facility, indeed the valve space is initially pressureless. If the pressure tank and the lock chamber are then pressurized to about 2,000 bar, it has been found that that the valve body is squeezed in by the valve seats due to the high pressure and is very difficult to move or cannot be moved at all. The pressure difference on starting operation can be largely reduced by way of the pressure inlet which is connected for example to a bypass of a pressure conduit, with which pressure conduit the pressure tank and/or the lock chamber can also be pressurized, so that the valve body is not squeezed in by the high pressure. For example, the pressure inlet can be arranged laterally on the refilling valve if the valve entry and the valve exit are arranged on the refilling valve vertically at the top or bottom.

According to a third aspect, the valve space is purgable. Herein, the refilling valve comprises a purge inlet and a purge outlet, via which the valve space can be purged (flushed). For example, the purge inlet can be arranged laterally on the refilling valve at a first side and the purge outlet laterally on the refilling valve at a second side which lies diametrically opposite the first side, if the valve entry and valve exit are arranged on the refilling valve vertically at the top or bottom. Herewith, abrasive agent which blocks or clogs the refilling valve can be purged or flushed during the closure position. This is particularly advantageous in combination with the second aspect of a pressure inlet, since a purging throughput can be carried out given a pressureless valve space and the valve space can subsequently be pressurized again via the pressure inlet, so that the valve body is not squeezed in by the high pressure. In combination with the pressure inlet, it is advantageous if the purge outlet is closable via a purge outlet valve and the valve space can be pressurized via the purge inlet when the purge outlet valve is closed. This means that the purge inlet can be used selectively as a pressure inlet or as a purge inlet. For this reason one only needs one inlet, which functions as a pressure inlet as well as a purge inlet.

According to a fourth aspect, the refilling valve comprises an entry-side valve seat and an exit-side valve seat, wherein at least one of the valve seats is adjustable so that the distance of the valve seats to one another can be adjusted. Herewith, the refilling valve can be optimally adjusted, in order on the one hand to be sealed and on the other hand not to block. A readjustment of the distance of the valve seats to one another can be advantageous on starting operation of the facility, given temperature fluctuations, a stubborn blockage by abrasive agent and/or due to material wear. So as not to have to switch off or dismantle the facility for this, optionally a tool opening, through which a tool can engage, in order to adjust the at least one adjustable valve seat, can be provided. For example, the at least one adjustable valve seat can be rotatable by way of a lever or key which is introduced through the tool opening, and can therefore be axially adjustable via a thread. The operating person can herewith immediately intervene manually, in order to be able to ensure a continuous operation. Preferably however, the adjustment of the valve seat can be carried out in a service procedure given a pressureless facility. Alternatively or additionally, the readjustment can also be effected in an automatically controlled and/or regulated manner via a motor. Herein, any unsealedness can be recognized via a pressure drop which is determined by way least one pressure sensor, and any seizure of the valve body via a torque which is necessary for moving the valve body. Alternatively or additionally to this, a parameter can indicate a seizure of the valve body, wherein the parameter is correlated to the torque which is necessary for moving the valve body, for example the power consumption of a servo drive motor which drives the valve body, in order to open and to close the refilling valve.

Optionally, with regard to the manner of functioning and activation of the refilling valve according to the first aspect and possibly in combination with at least one of the other aspects, the valve body can be brought from the first closure position into the first open position via a rotation in a first direction and into the second open position via a rotation in a second direction. Preferably, the valve body can herein comprise a second closure position, wherein the valve body can be brought from the second closure position into the second open position via a rotation in the first direction and into the first open position via a rotation in the second direction. Optionally, the valve body can be brought from the first open position into the second open position by way of a 180° rotation. A second closure position can also be advantageous since the valve body can become more worn either at the entry side or at the exit side and hence the wearing can be distributed onto two sides and a possibly less worn side can be rotated towards the side which is to be sealed off. Here, the wearing at the entry side can be higher, since the lock chamber which is connected at the entry side is temporally non-pressurized, whereas the exit-side pressure tank remains subjected to pressure.

Optionally, the refilling valve can be designed as a ball cock, wherein the valve body is essentially spherical with an axial through-hole, wherein the valve entry and the valve exit are arranged on diametrically opposite sides of the valve body, wherein the axial through-hole lies coaxially to the valve entry and the valve exit in the first and the second open position.

Optionally, the valve body can be rotatable about a rotation axis which is essentially perpendicular to the axial through-hole. Herein, the valve body is preferably driveable in a controlled manner via a motor in the form of a servomotor. Herein for example, a drive direction and/or a drive speed and/or a drive moment of the motor can be regulated (closed-loop controlled) depending on a torque which is required for driving the valve body or on at least one parameter which correlates with the required torque. For example, a power consumption of the motor or a motor current can be such a parameter which correlates with the required torque.

Optionally, the motor can be regulated in a manner such that the drive direction is changed on exceeding a threshold for a torque which is required for driving the valve body or on exceeding a threshold for at least one parameter which correlates with the required torque. Alternatively or additionally, the required torque can be detected via a torque sensor, e.g. in the form of a strain gauge, or the rotation speed at a given motor power. The motor can hereby also simply move into the other drive direction if the resistance for moving the valve body in one drive direction is too high.

Optionally, the refilling valve can comprise a second closure position between the second open position and the first open position, wherein the motor can be regulated in a manner such that the drive direction remains the same when a threshold value for the torque which is required for driving the valve body is not exceeded or a threshold for at least one parameter which correlates with the required torque is not exceeded.

Optionally, a monitoring unit can be provided, said monitoring unit being designed to monitor a torque which is required for driving a valve body or at least one parameter which correlates with the required torque, over at least one time window in a continuous or discrete manner, in order to recognize wearing or to indicate an error occurrence or a service case. The monitoring unit can be part of the motor control or be designed separately. The monitoring unit can herein store parameters over at least one time window, in order to display the amplitude and/or frequency of torque peaks, interpret them as an error occurrence or service case or use them for the more regulation (closed-loop control). For example, in a first time window the amplitude and/or frequency of torque peaks can be recorded continuously or in discrete values, then initiated for example into a to and fro movement of the valve body, then in a second time window the amplitude and/or frequency of the torque peaks again recorded continuously or in discrete valves and finally the values of the first and second time window compared. If the amplitude and/or the frequency of the torque peak has not reduced to an adequate extent by way of the to and fro movement of the valve body, then an error notice or service notice can be displayed.

In such a case of an error or service, according to the second aspect possibly the valve space can be pressurized and/or according to the third aspect can be purged preferably in a service procedure given a pressureless facility. Alternatively or additionally, according to the fourth aspect, the readjusting of at least one valve seat can preferably be effected in a service procedure given a pressureless facility.

Each of these measures however can also take place during a continuous operation of the cutting facility, so that an error or service case of the refilling valve can be dealt with without compromising the continuous operation of the cutting facility.

Optionally, with regard to the manner of functioning of the complete facility, the valve entry is arranged at an upper side and the valve exit at a lower side of the refilling valve, wherein the lock chamber is arranged above the refilling valve and the pressure tank is arranged below the refilling valve, so that abrasive agent can flow through the refilling valve assisted or driven by gravity. The water which is displaced out of the pressure tank by the inflowing abrasive agent can run upwards out of the pressure tank into the lock chamber via a backflow conduit from the pressure tank upwards into the lock chamber. During this refilling, the lock chamber, as the pressure tank is pressurized and a circulation exists, concerning which abrasive agent post-flows out of the lock chamber into the pressure tank and water moves up out of the pressure tank into the lock chamber until the lock chamber then largely only contains water. This circulation can be assisted or driven by a pump, preferably with an externally driven impeller, for accelerating the refilling procedure, wherein the pump can preferably be arranged at the backflow conduit which leads water with a reduced or no abrasive agent share. The cutting facility can continue to run during this filling procedure, since the pressure tank remains constantly pressurized. A filter or separator can be present in the circulation upstream of the pump, in order to filter or separate out abrasive agent, so that the pump wears as little as possible due to abrasive agent.

Optionally, the facility comprises a refilling funnel and a filling valve, wherein the filling valve comprises a valve entry, a valve exit, a valve space which is arranged between the valve entry and the valve exit, and a valve body which is located in the valve space, wherein the valve entry is connected to the refilling funnel and the valve exit to the lock chamber. Whereas the refilling valve can hence represent a lower lock valve, the filling valve can represent an upper lock valve with a lock chamber which lies between the valves. The refilling valve and the filling valve are herein preferably never simultaneously opened in continuous operation of the facility. The refilling valve can preferably be opened given a pressurized lock chamber with the refilling procedure of the pressure tank with abrasive agent from the lock chamber, whereas the filling valve can be opened given a non-pressurized lock chamber with the refilling procedure of the lock chamber with abrasive agent from the refilling funnel. Even if the problem of the blocking and clogging tends to exist more for the refilling valve, since it is only the refilling valve which needs to be actuated at a high pressure, the refilling valve and the filling valve can be designed in an essentially identical manner. Alternatively however, the filling valve can also be designed in a less complex manner, for example without a pressure inlet, without a purge inlet and purge outlet and/or without adjustable valve seats.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
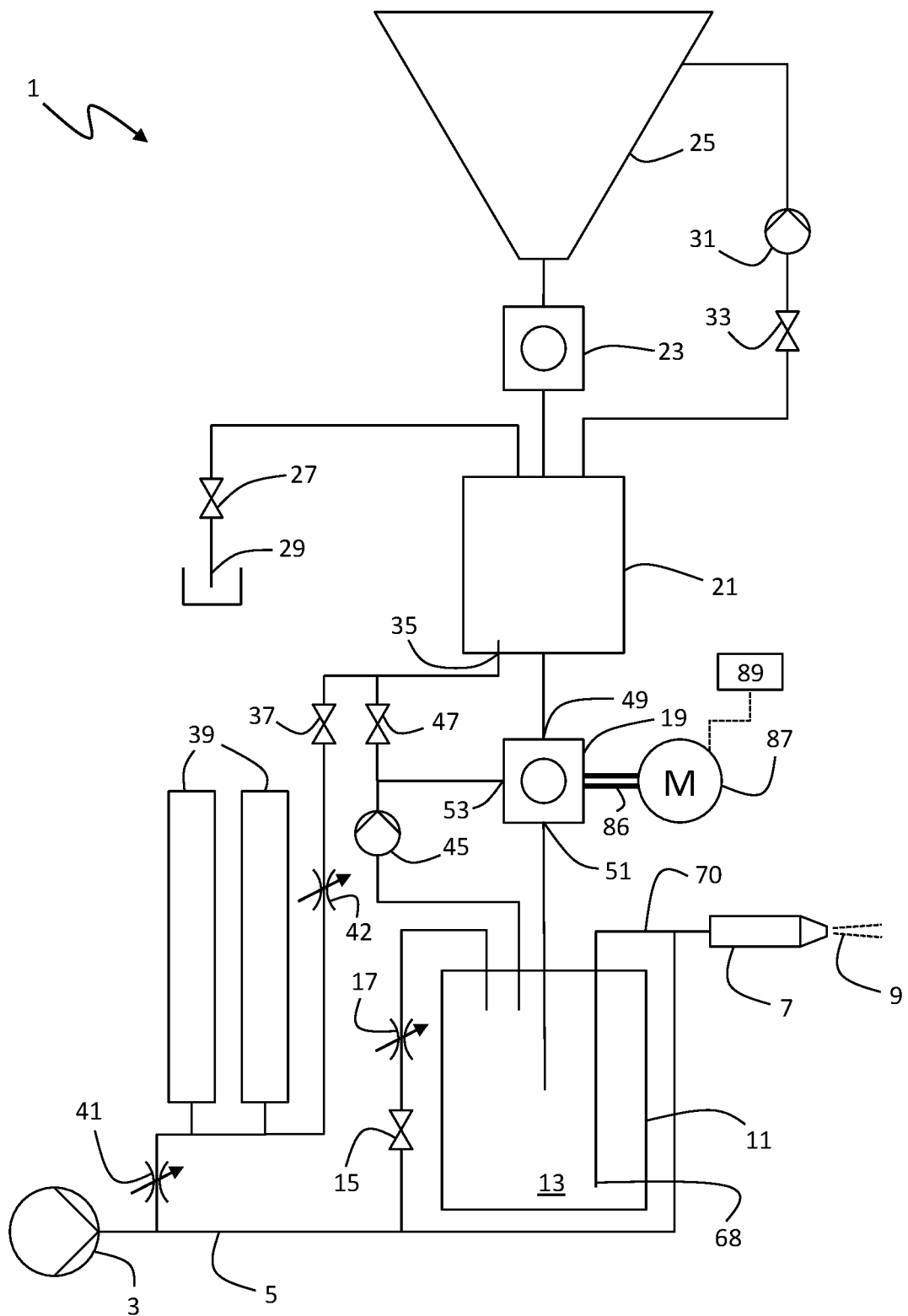
FIG. 1 is a schematic block diagram of a first embodiment example of the water-abrasive suspension cutting facility which is disclosed herein.

The water-abrasive suspension cutting facility 1 which is shown in FIG. 1 comprises a high-pressure source 3 which in a high-pressure conduit 5 provides water at a high pressure $p_0$ of about 1,500 to 4,000 bar. The high-pressure conduit 5 is connected to an exit nozzle 7, from which the water which is under a high pressure exits in a jet 9 at a very high speed. In order for the jet 9 to be able to be used effectively as a cutting jet for cutting material, the high-pressure conduit 5 is branched in a manner such that at least a part of the throughflow through the high-pressure conduit 5 is led through a pressure tank 11, in which a water-abrasive agent suspension 13 is located. The feeding of the water-abrasive agent suspension 13 to the exit nozzle can be switched on and off via a shut-off valve 15. The share of the water-abrasive agent suspension 13 in the jet 9 can be adjusted via a throttle 17, by way of the throughput quantity in the auxiliary line of the high-pressure conduit 5 which is led through the pressure tank 11 being throttled. The throttle 17 can be designed statically for example in the form of a hole plate or be adjustable or regulatable. The throttle 17 is preferably adjustable, so that the throttle 17 can shut off the feed flow into the pressure tank 11, possibly also in a complete manner, so that one can make do without the shut-off valve 15. The throttle 17 is preferably regulatable, wherein a signal which is characteristic of the abrasive agent removal flow and which can be obtained from a sensor or from an available operating parameter can be used as a control variable for the regulation of the opening of the throttle 17 (see FIG. 7a-c).

On cutting, water-abrasive agent suspension 13 is taken from the pressure tank 11 and water is fed to this at a high pressure, wherein the abrasive agent which is located in the pressure tank 11 is therefore consumed. The pressure tank 11 must therefore be continuously or sequentially refilled with abrasive agent. For this, a refilling valve 19 in the form of a ball cock is arranged above the pressure tank 11. The refilling valve 19 connects a lock chamber 21 which is arranged above the refilling valve 19, to the pressure tank 11. In turn, a filling valve 23 which connects a refilling funnel 25 which is arranged above the lock chamber 21 to the lock chamber 21 is arranged above the lock chamber 21. The filling valve 23 can be designed with an essentially an identical construction as the refilling valve 19 in the form of a ball cock.

The refilling funnel 25 is not under pressure, so that dry, humid or wet abrasive agent or a water-abrasive agent suspension can be filled in from above (see FIGS. 8-12). This at least partly can be an abrasive agent which is recovered from the cutting jet 9 and which in a dry, wet, frozen, pelleted or suspended form can be filled from above into the refilling funnel 25 via a delivery device (see FIGS. 8-12). If the refilling valve 19 is closed, then the lock chamber 21 can be partly without pressure. For example, a pressure in the lock chamber 21 can be relieved into a discharge 29 via a pressure relief valve 27 in the form of a needle valve. The filling valve 23 can be opened given a pressureless lock chamber 21, so that abrasive agent falls from the refilling funnel 25 into the lock chamber 21. This filling of the lock chamber 21 with abrasive agent due to gravity can be assisted or accelerated by a pump 31. The pump 31 can be connected to the lock chamber 21 at the suction side and to the refilling funnel 25 at the delivery side. The pump 31 can herewith suck abrasive agent into the lock chamber 21. Above all, this makes particular sense if abrasive agent gets clogged in the tapered lower region of the refilling funnel 25 or at the filling valve 23. A clogging can be overcome or the occurrence of such can be prevented by way of sucking the abrasive agent downwards by way of the pump 31. So that the pump 31 does not need to be designed for high pressure, it is advantageous for the pump to be able to be shut off from the lock chamber 21 by way of a pump shut-off valve 33 in the form of a needle valve. The pump shut-off valve 33 can herein be designed such that it can be purged, in order to purge the valve seat and the valve body, e.g. in the form of a valve needle, free of abrasive agent (see FIGS. 19a-b). By way of this, on the one hand a sealed closure of the pump shut-off valve 33 is ensured and on the other hand the material wear in the valve is reduced. The pump 31 can be protected from abrasive agent to a high degree by a filter and/or separator (both not shown) which are arranged upstream.

The pump shut-off valve 33 is only opened when the lock chamber 21 is already pressureless. For this reason, a first embodiment of the needle valve according to FIG. 19a can be used for the pump shut-off valve 33, concerning which a lateral purge inlet and a lateral purge outlet which lies opposite this are provided. In contrast, the second embodiment of the needle valve according to FIG. 19b, concerning which a check valve is provided on the purge inlet, is more advantageous for the pressure relief valve 27. Since the pressure relief valve 27 is opened at high pressure, the check valve prevents a pressure relief in the direction of the purge inlet. The purge outlet can run out into the discharge 29, so that the pressure relief as well as the purging agent discharge takes place exclusively towards the discharge 29 and not to the purge inlet.

The filling valve 23 can be closed as soon as the lock chamber 21 is then filled for example with 1 kg of abrasive agent. Furthermore, the pressure relief valve 27 and the pump shut-off valve 33 are now closed. The lock chamber 21 in a lower region comprises a pressurization entry 35, via which the lock chamber 21 can be pressurized. The pressurization entry 35 in the embodiment example of FIG. 1, in a manner capable of being shut off is connected to a pressure accumulator 39 via a pressurization valve 37 in the form of a needle valve and to the high-pressure conduit 5 via throttles 41, 42. The pressure accumulator 39 comprises two pressure accumulator units in the form of spring accumulators which are connected in parallel to the entry of the pressurization valve 37. The pressure accumulator 39 is connected to the high-pressure conduit 5 via the throttle 41. The throttles 41, 42 can be designed in a static manner, for example in the form of hole plates, or in an adjustable or regulatable manner. If the throttles 41, 42 are adjustable to a certain degree, with regard to which the connection between the high-pressure conduit 5 and the pressurization entry 35 can be completely shut off, then one can possibly make do without the pressurization valve 37. The pressure accumulator 39 is completely charged in pressure before the lock chamber 21 is pressurized. As soon as the pressurization valve 37 is opened, the pressure accumulator 39 discharges pressure into the lock chamber 21 and hence rapidly subjects this to about 40% of the high pressure $p_0$ which is provided in the high-pressure conduit 5 as a nominal high pressure by the high-pressure source 3. A pressure impulse is introduced from below into the lock chamber 21 by way of this rapid part-pressurization, said pressure impulse loosening up the abrasive agent. This is advantageous for the later discharge of the abrasive agent into the pressure tank 11. Since the high-pressure conduit 5 is also connected to the lock chamber 21 via the throttle 41, a throttled, i.e. slower pressurization through the high-pressure conduit 5 takes place with the opening of the pressurization valve 37. As soon as the pressure accumulator 39 is discharged of pressure, the remaining required pressure in the lock chamber 21 is built up from about 60% of the nominal high pressure $p_0$ exclusively via the throttled, i.e. slower pressurization from the high-pressure conduit 5. The amplitude of the pressure drop in the high-pressure conduit 5 is limited to a minimum herewith.

In the first embodiment which is shown in FIG. 1, the pressure accumulator 39 is charged in pressure immediately from the moment, in which it has discharged itself of pressure. In this case, the high-pressure conduit 5 pressurizes the lock chamber 21 with the residual pressure as well as the pressure accumulator 39. This is particularly advantageous when the charging of the pressure accumulator 39 with pressure is so time-consuming that the refilling throughput rate depends on the pressure charging time of the pressure accumulator 39.

Figure 2:
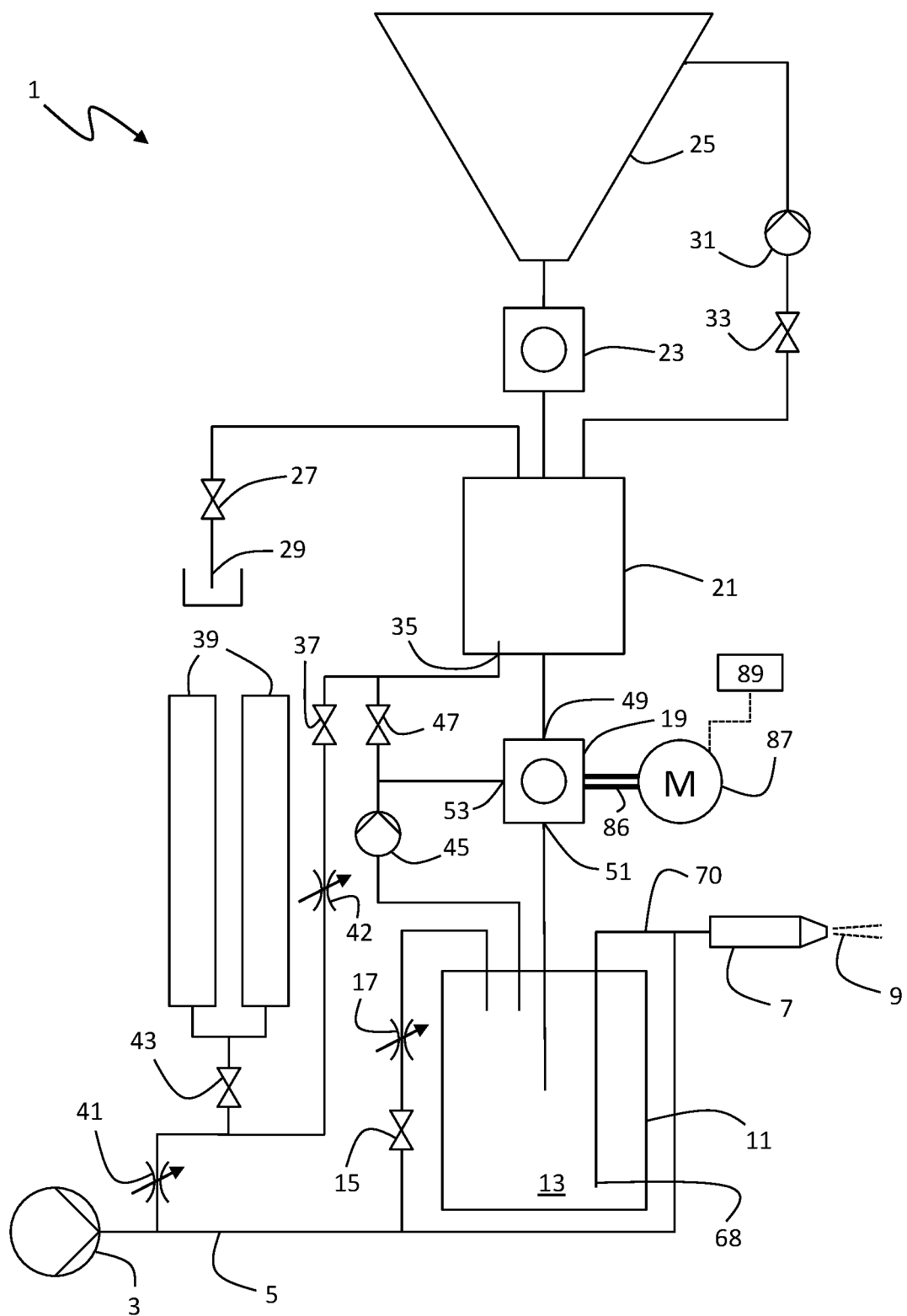
FIG. 2 is a schematic block diagram of a second embodiment example of the water-abrasive suspension cutting facility which is disclosed herein.

In the second embodiment which is shown in FIG. 2, the pressure accumulator 39 can be shut off by a pressure accumulator valve 43 in the form of a needle valve. The pressure accumulator valve 43 can be shut off at the moment, in which the pressure accumulator 39 has discharged itself of pressure, in order not to additionally load the high-pressure conduit 5 by the pressurization of the pressure accumulator 38 during the pressurization of the lock chamber 21. Such a loading could cause a pressure drop in the high-pressure conduit 5 which could have a negative influence upon the cutting performance at the exit nozzle 7. For this reason, it is advantageous for the pressure accumulator valve 43 not to open until the lock chamber 21 is completely pressurized and the pressurization valve 37 is closed, so that the pressure accumulator 39 can be charged in pressure from the high-pressure conduit 5 via the throttle 41. In particular, this is advantageous if the pressure charging of the pressure accumulator 39 is not so time-consuming that the refilling throughput rate depends on the pressure charging time of the pressure accumulator 39. The filling of the lock chamber 21 and the refilling of the pressure tank 11 can last at least longer than the pressure charging of the pressure accumulator 39. The throttle 41 can be set/adjusted such that the pressure charging of the pressure accumulator 39 takes its course as slowly as possible, but still rapidly enough so that the pressure accumulator 39 is completely charged in pressure before the next procedure, for pressurizing the lock chamber 21.

Figure 3:
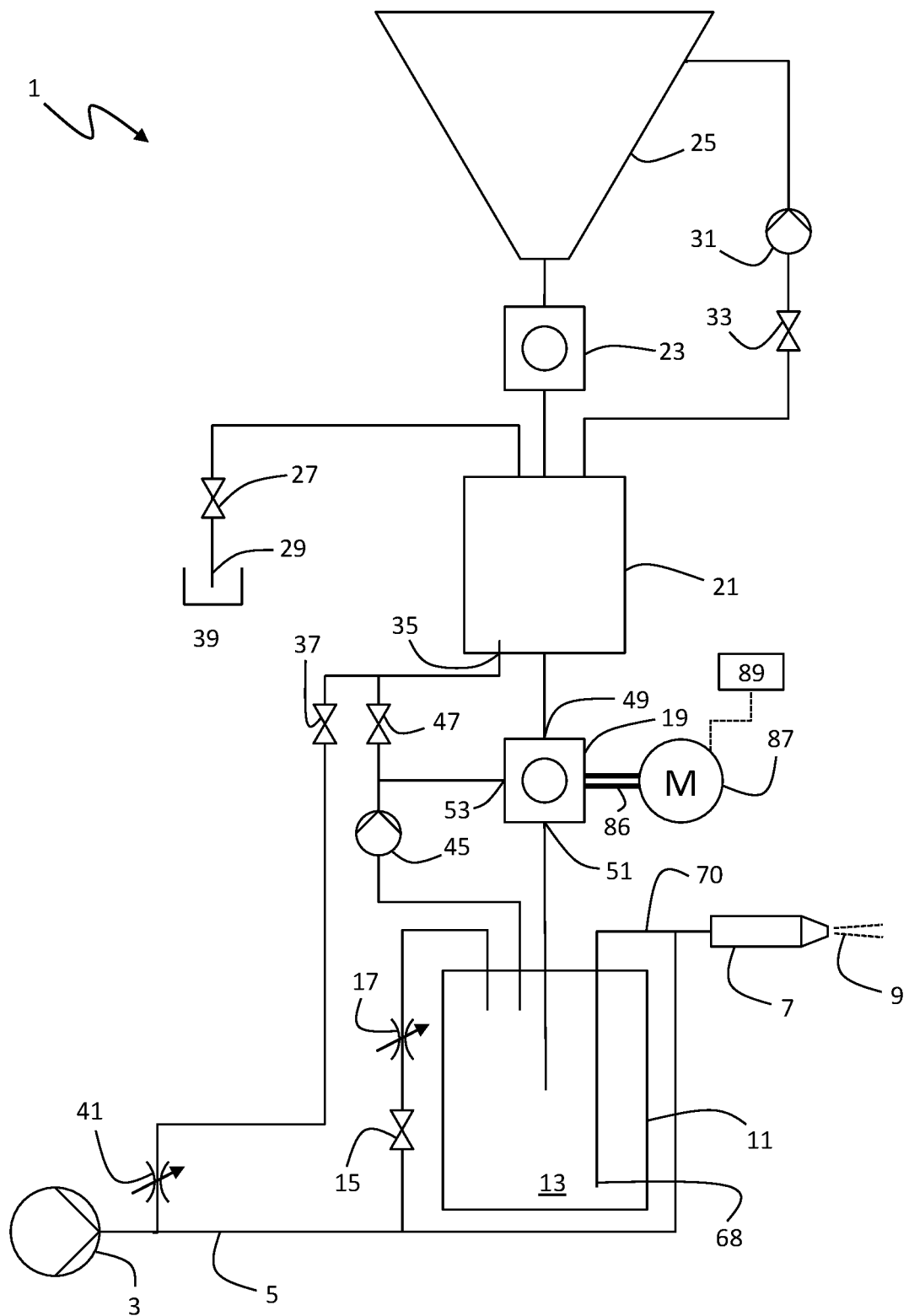
FIG. 3 is a schematic block diagram of a third embodiment example of the water-abrasive suspension cutting facility which is disclosed herein.

In a third embodiment according to FIG. 3, one completely forgoes the pressure accumulator 39, and the lock chamber 21 is pressurized exclusively from the high-pressure conduit via the throttle 41. This is advantageous if the high-pressure source 3 for example via a servo pump control can react so quickly to an initial pressure drop and the pump power adapted accordingly, that a large amplitude of the pressure drop does not even occur in the first place. An initial pressure drop can be communicated to the high-pressure source 3 via pressure sensors, so that the high-pressure source 3 can rapidly counter-control a further pressure drop with an increase in the power or a speed increase. The initial pressure drop can already be lessened via the throttle 41, so that at no point in time does a pressure drop which significantly compromises the cutting power occur.

As soon as the lock chamber 21 has now been completely pressurized, the refilling valve 19 can be opened, so that abrasive agent can flow out of the lock chamber 21 through the refilling valve 19 into the pressure tank 11 due to gravity or assisted by gravity, in order to refill this pressure tank. A delivery aid 45, for example in the form of a pump is preferably provided, said delivery aid at the suction side being connected to the pressure tank 11 and at the delivery side to the lock chamber 21. The delivery aid 45 assists or produces the abrasive agent flow from the lock chamber 21 downwards into the pressure tank 11. It can prevent or release clogging of abrasive agent and accelerate the refilling procedure which is caused or assisted by gravity. In contrast to the pump 31 on the refilling funnel 25, the delivery aid 45 on the pressure tank 11 operates with water at the nominal high pressure $p_0$. For this reason, it must be designed for high-pressure operation. For example, as is shown in FIG. 6b, it can merely comprise an inductively driven impeller in high-pressure, so that the number of moving parts which are subjected to a high pressure is minimized. A delivery aid shut-off valve 47 is arranged between delivery aid 45 and the lock chamber 21, wherein the delivery aid shut-off valve 47 in the form of a needle valve can shut off the pump 47 with respect to the lock chamber 21 when the lock chamber 21 is not or not completely pressurized. The delivery aid shut-off valve 47 is preferably a purgable needle valve according to FIG. 19b with a check valve at the purge inlet, since it is actuated at a high pressure.

Figure 6A:
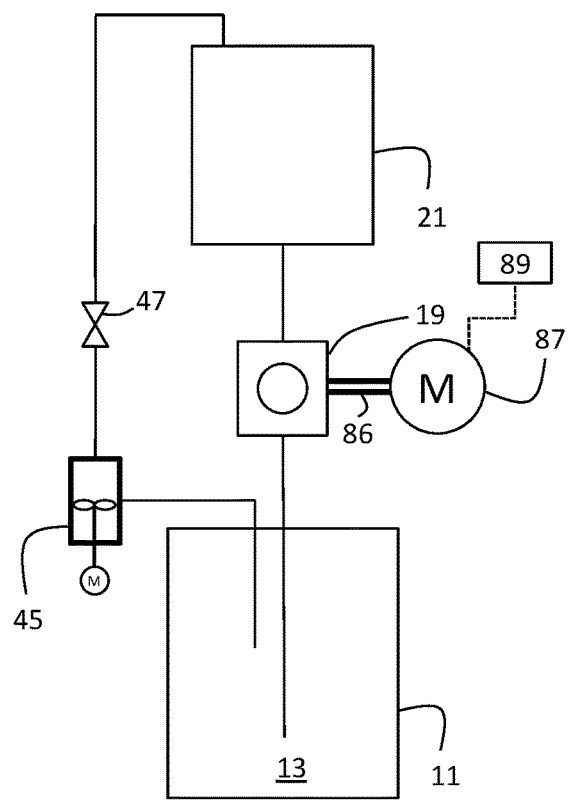
FIG. 6a is a schematic part block diagram of a first embodiment of a delivery aid of the water-abrasive suspension cutting facility which is disclosed herein.
Figure 6B:
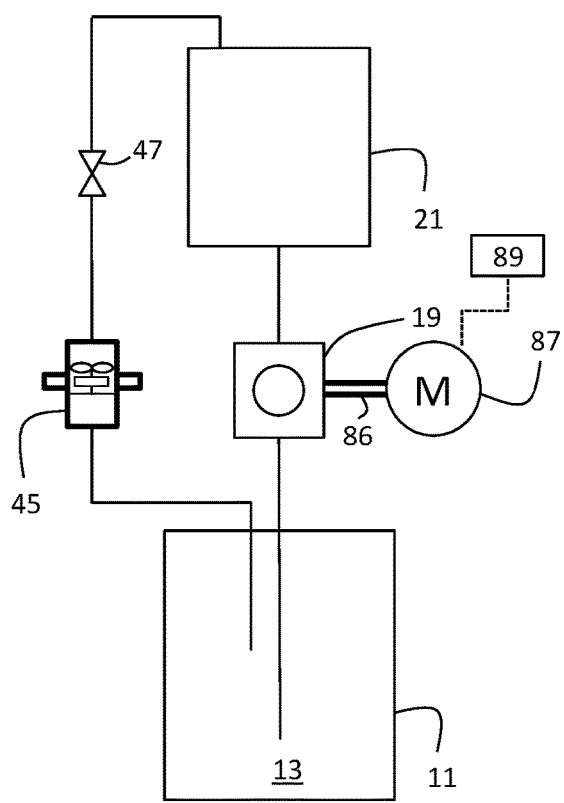
FIG. 6b is a schematic part block diagram of a second embodiment of a delivery aid of the water-abrasive suspension cutting facility which is disclosed herein.
Figure 6C:
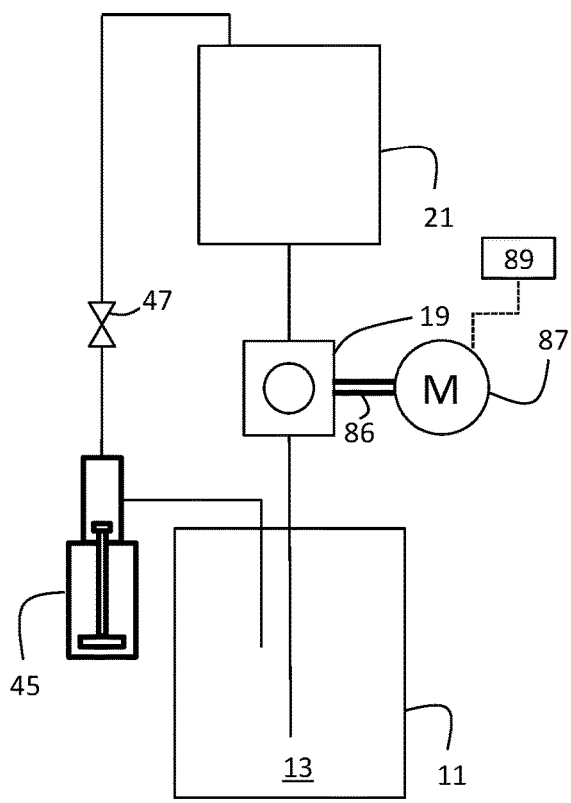
FIG. 6c is a schematic part block diagram of a third embodiment of a delivery aid of the water-abrasive suspension cutting facility which is disclosed herein.

FIG. 6a-c show different alternative embodiments for the delivery aid 45. The delivery aid 45 for example can comprise an impeller which is externally driven by a shaft (see FIG. 6a) or an inductively driven impeller (see FIG. 6b). The delivery aid 45 can also assist in the refilling of abrasive agent into the pressure tank 11 via a piston stroke (see FIG. 6c). The delivery aid 45 can pump or deliver in a continuous manner or in a temporally limited or pulsed manner. Possibly, it can be sufficient for the abrasive agent flow into the pressure tank 11 to only initially be assisted and for it to then continue in a sufficiently rapid manner solely in a gravity-assisted manner. Alternatively or additionally, the abrasive agent flow into the pressure tank 11 can be assisted or produced in a continuous manner.

Apart from an upper entry 49 and a lower valve exit 51, the refilling valve 19 can also comprise a lateral pressure inlet 53. A valve space, in which a movable valve body is located, can be subjected to pressure via the pressure inlet 53. Specifically, in the absence of pressurization of the valve space, it can be the case that the very high pressures upon the valve entry 49 and the valve exit 51 on starting operation of the facility press the valve body so greatly into the valve seat that the valve body can no longer be moved. A pressure compensation in the refilling valve 19 can be created via the lateral pressure inlet 53, so that the valve body is movable after starting operation.

Figure 4:
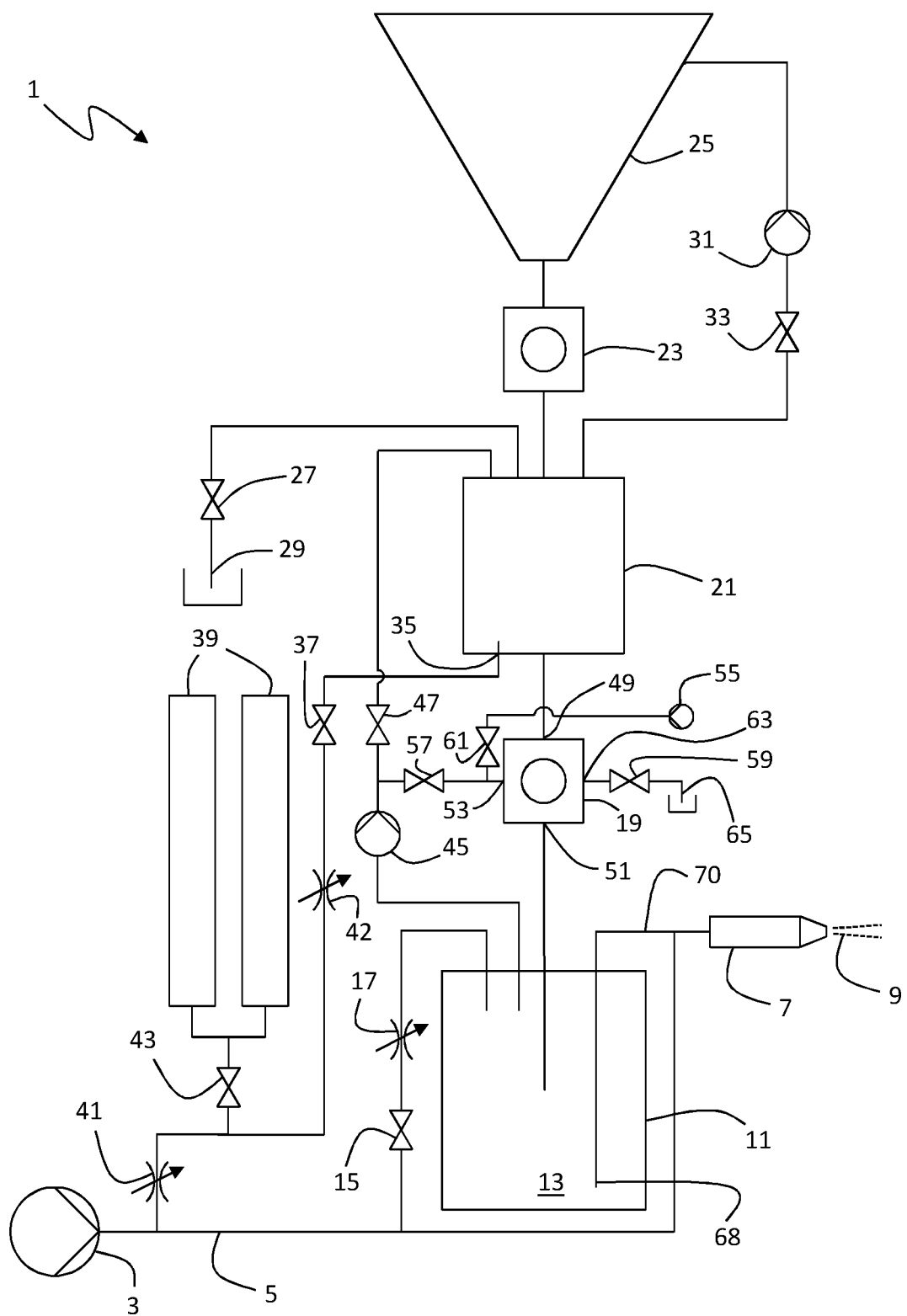
FIG. 4 is a schematic block diagram of a fourth embodiment example of the water-abrasive suspension cutting facility which is disclosed herein.
Figure 5:
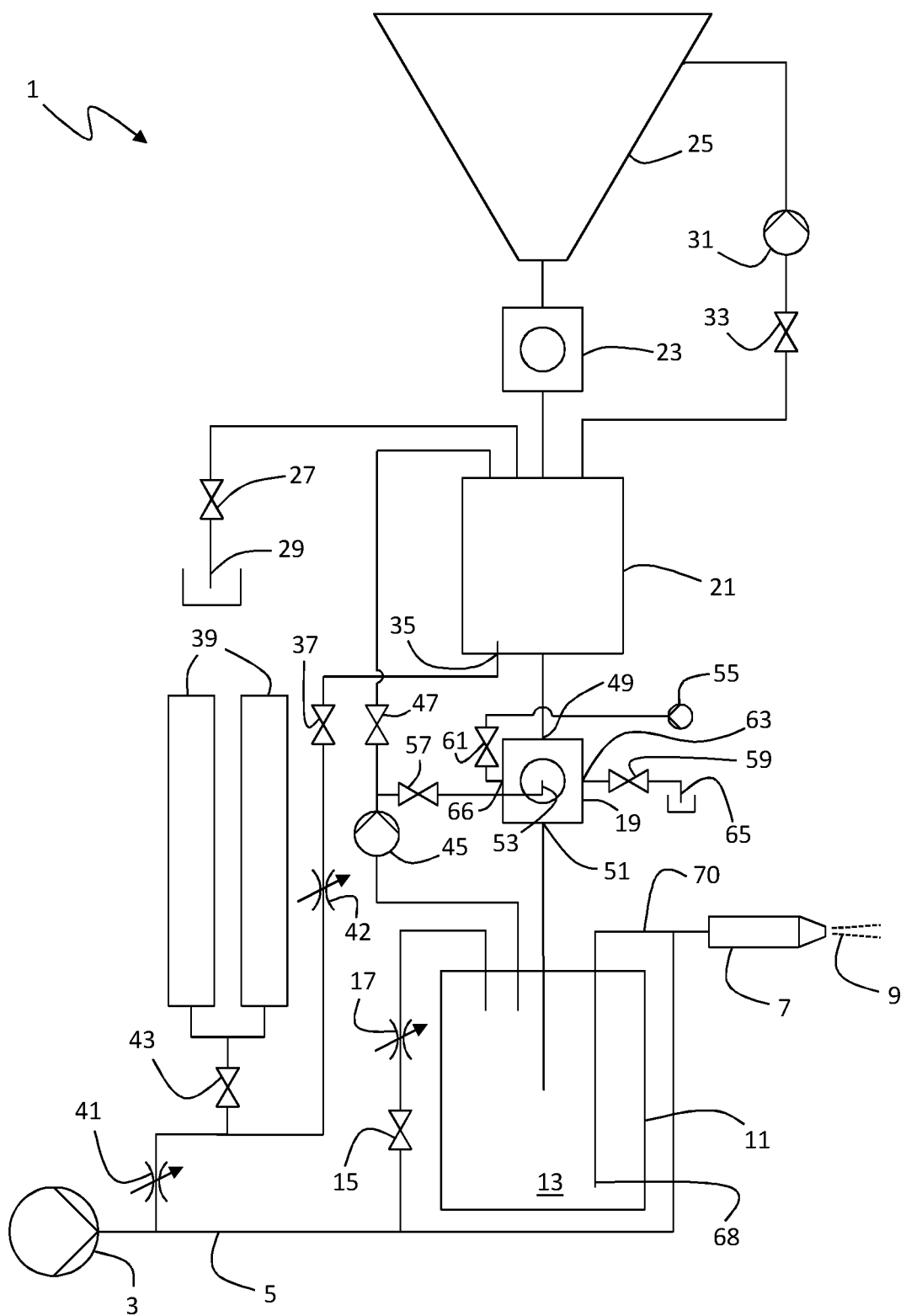
FIG. 5 is a schematic block diagram of a fifth embodiment example of the water-abrasive suspension cutting facility which is disclosed herein.

A purging (flushing) for the refilling valve 19 is provided in the fourth or fifth embodiment example which is shown in FIGS. 4 and 5. For this, a purging source 55 can be connected to the pressure inlet 53 in a manner capable of being shut off (see FIG. 4). Preferably, three purge valves 57, 59, 61 (flushing valves) which can switch the purging on and off which is to say separate it from the high pressure, are provided for this. A first purge valve 57 in the form of a needle valve is arranged between the delivery aid 45 and the pressure inlet 53. A second purge valve 59, here also denoted as a purge outlet valve 59, in the form of a needle valve is arranged between a lateral purge outlet 63 and a discharge 65. A third purge valve 61 in the form of a needle valve is arranged between the purging source 55 and the pressure inlet 53.

The refilling valve 19 is preferably closed in order to now purge the refilling valve 19 with water or a water-purging agent mixture, in order to be able to free a valve space of the refilling valve 19 from the abrasive agent residue. The first purge valve 57 is likewise closed so that pressure can be relieved from the pressure inlet 53 without relieving the pressure at the delivery aid 45. The second purge valve 59 is opened towards the discharge 65, so that the possibly existing high pressure can be relieved from the valve space. If now the third purge valve 61 is opened, then water or a water-purging agent mixture flows through the valve space to the discharge 65 and hence purges (rinses) this free of abrasive agent residues. The purging of the refilling valve 19 given a completely pressureless facility 1, in order to be able to completely flush out the valve space and herein to possibly be able to move the valve body, is preferably carried out as a service procedure.

As an alternative to the fourth embodiment according to FIG. 4, in a fifth embodiment according to FIG. 5 a purge inlet 66 can be provided separately from the pressure inlet 53 (see also FIGS. 15a-b and 17a-b). The pressure inlet 53 can be arranged coaxially to a servomotor shaft 86 and be arranged opposite this, wherein the purge inlet 66 and the purge outlet 63 transversely to the servomotor shaft 86 can be arranged coaxially to one another and each at opposite sides.

The purging is completed again by way of closing the three purge valves 57, 59, 61 in the reverse sequence, i.e. the third purge valve 61 is firstly closed, so that the purging flow is stopped. The second purge valve 59 is then closed, in order to close off the valve space with respect to the discharge 65. Finally, the first purge valve 57 can be opened so that the valve space is subjected to high pressure. The pressurizing of the valve space is advantageous since a valve body in the refilling valve 19 can be pressed so greatly into a valve seat by way of the high pressure difference between the valve exit 51 or the valve entry 49 and the valve space, that this valve body can no longer be moved. In contrast, the pressurizing of the valve space creates a pressure equalization, so that the valve body in the refilling valve 19 remains movable.

Figure 7A:
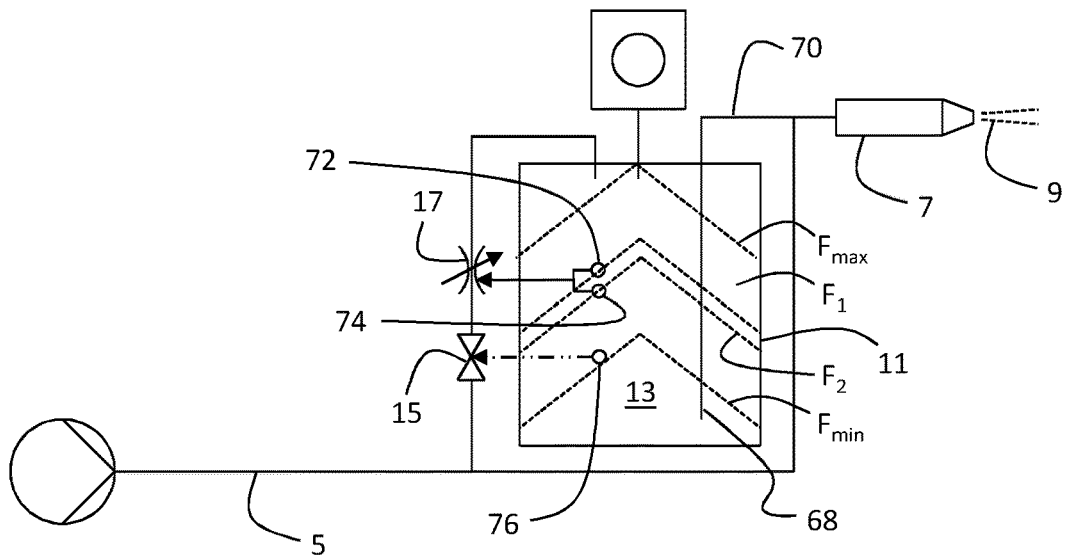
FIG. 7a is a schematic part block diagram of a first embodiment of an abrasive agent flow control of the water-abrasive suspension cutting facility which is disclosed herein.
Figure 7B:
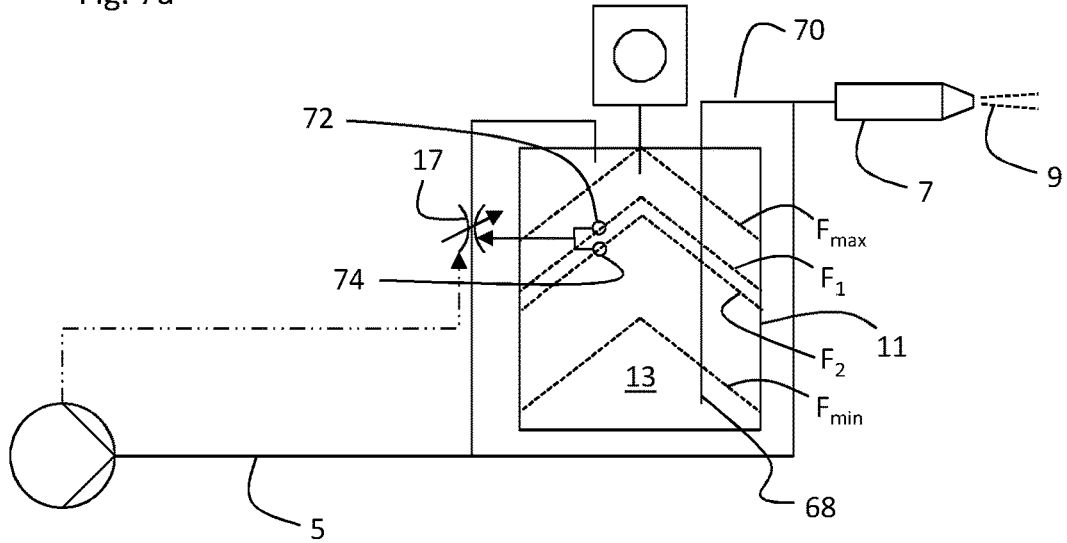
FIG. 7b is a schematic part block diagram of a second embodiment of an abrasive agent flow control of the water-abrasive suspension cutting facility which is disclosed herein.
Figure 7C:
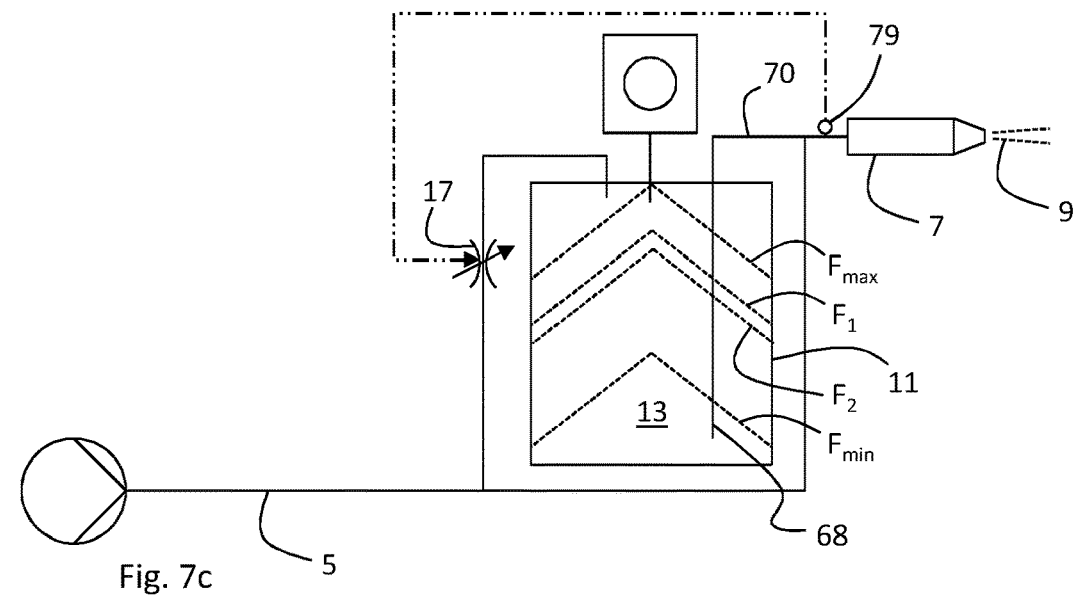
FIG. 7c is a schematic part block diagram of a third embodiment of an abrasive agent flow control of the water-abrasive suspension cutting facility which is disclosed herein.
Figure 8:
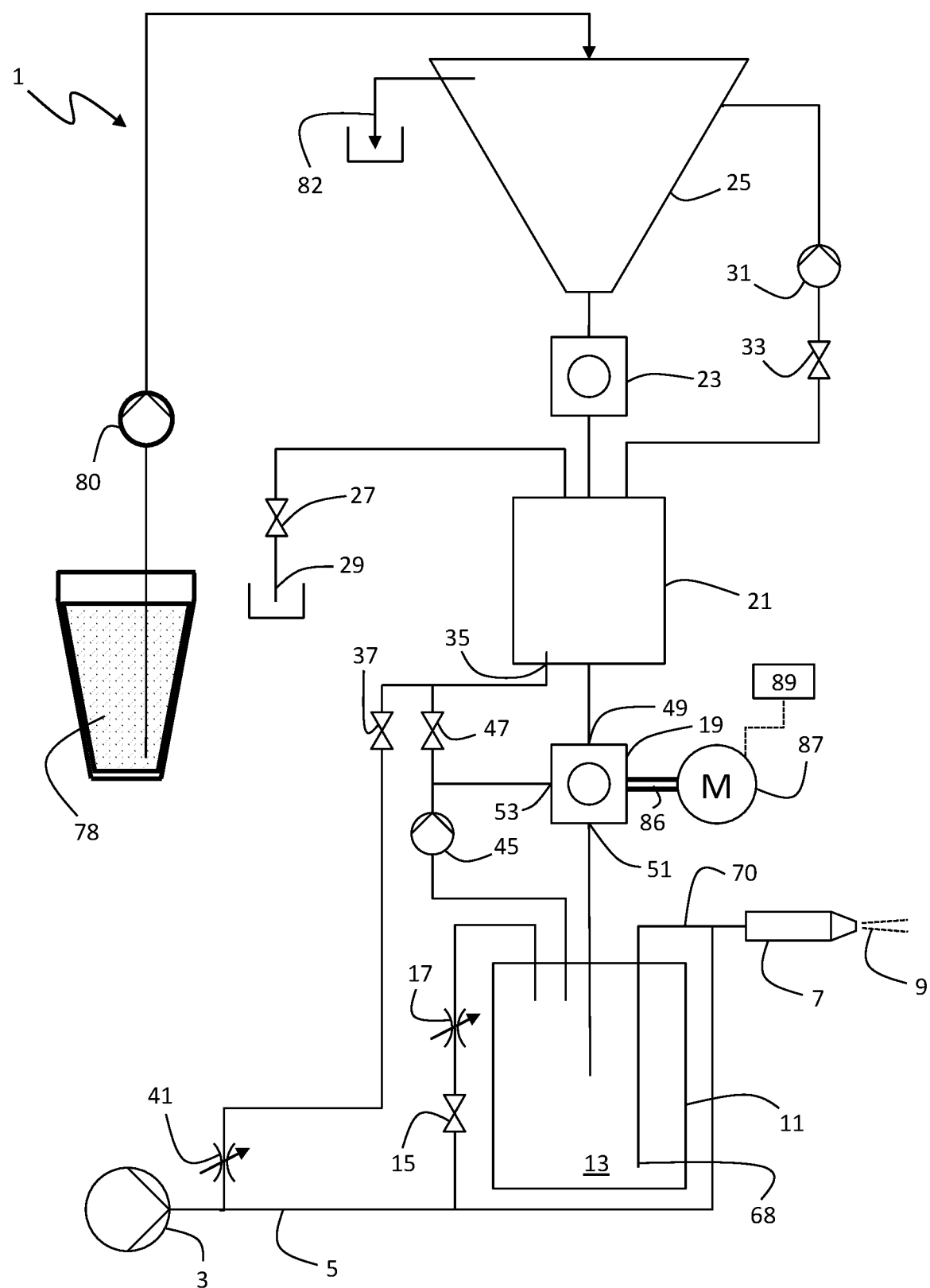
FIG. 8 is a schematic block diagram of a first embodiment of an abrasive agent refilling device of the water-abrasive suspension cutting facility which is disclosed herein.

A preferred regulation (closed-loop control) of the abrasive agent removal flow is illustrated in the part block diagrams according to FIG. 7a-c. A branching of the high-pressure conduit 5 is led through the pressure tank 11 which is filled with abrasive agent suspension 13, for admixing abrasive agent into the cutting jet 9. A removal location 68 which is arranged in the lower region of the pressure tank 11 is connected to the exit nozzle 7 via an abrasive agent conduit 70, and a branching of the high-pressure conduit 5 is led via a regulation valve or regulatable throttle 17 into an upper region of the pressure tank 11. The abrasive agent conduit upstream of the exit nozzle 7 is brought together again with the high-pressure conduit 5 downstream of the pressure tank 11, so that the cutting jet for example comprises a mixing ratio of 1:9 of abrasive agent suspension to water. Herein, the mixing ratio can be regulated (closed-loop controlled) via the throttle or regulation valve 17, which is connected to the pressure tank 11 at the entry side. Given a maximal open position of the regulation valve 17, the abrasive agent removal flow is maximal and the mixing ratio is maximal. Given a minimal open position or closure position (see FIG. 7b or 7c) of the regulation valve 17, the abrasive agent removal flow is minimal or zero and the mixing ratio is accordingly low or the cutting jet 9 then comprises exclusively water.

Now, for various reasons, it is advantageous to measure and regulate the actual abrasive agent removal flow. On the one hand, a certain mixing ratio can be optimal for the cutting of certain materials, workpieces or workpiece sections, concerning which only as much abrasive agent as is necessary for achieving the cutting performance is removed. Concerning inhomogeneous workpieces, the cutting power can be adapted during the cutting via the mixing ratio. On the other hand, the refilling of the pressure tank 11 with abrasive agent in accordance with the abrasive agent removal flow can be controlled such that sufficient abrasive agent suspension 13 is constantly present in the pressure tank 11 for a continuous cutting. In FIG. 7a-c, four different filling levels of the abrasive agent in the pressure tank 11 are indicated by dashed cones. Two further filling level cones $F_1$ and $F_2$ are shown between a maximal filling level cone $F_{max}$ and a minimal filling level cone $F_{min}$, wherein $F_{max} > F_1 > F_2 > F_{min}$. Here, it is once again pointed out that the complete facility 1 and in particular the pressure tank 11 are completely free of air. This means that the filling level cones are located in water subjected to high pressure. The maximal filling level cone $F_{max}$ is defined in that a backlog into the refilling valve 19 would result given a further refilling with abrasive agent into the pressure tank 11. The minimal filling level cone $F_{min}$ is defined in that given a further abrasive agent removal, the abrasive agent share of the abrasive agent suspension in the exit-side abrasive agent conduit 70 would reduce.

As is shown in FIGS. 7a and 7b, filling level sensors 72, 74, 76 can be arranged on the pressure tank 11, in order to signalize the reaching of the filling level cone. The filling level sensors 72, 74, 76 can be for example ultrasound sensors, optical sensors or light barriers, electromagnetic sensors or sensors of another type. Here, the filling level sensors 72, 74, 76 are ultrasound sensors which can signalize a reaching of a filling level cone via a change of the structure-borne sound. An upper filling level sensor 72 for example can signalize the reaching of the filling level cone $F_1$ and start a timer or define a point in time $t_1$. A lower filling level sensor 74 can for example signalize the reaching of the filling level cone $F_2$ and stop a timer after $\Delta t$ or define a point in time $t_2$. An average abrasive agent removal flow can be determined via the known geometry of the pressure tank 11 and the vertical distance of the filling level sensors 72, 74, as $\Delta V/\Delta t$ or $\Delta V(t_2-t_1)$. The third lowermost filling level sensor 76 can signalize the minimal filling level cone $F_{min}$ and immediately effect a shut-off of the shut-off valve 15 in order to prevent the pressure tank 11 from being sucked empty. According to FIG. 7b, other operating parameters such as for instance the pump speed of the high-pressure source 3 can be used for determining the abrasive agent removal flow and its regulation as a control variable for the regulation valve 17. As is shown in FIG. 7c, the abrasive agent throughput or the mixing ratio can be determined by way of a suitable sensor 79 also at the abrasive agent conduit 70 or upstream of the exit nozzle 7 and be used as a control variable for the regulation valve 17.

The filling level sensors 72, 74 can also be used to control or cycle the refilling cycles. For example, above the upper filling level sensor 72 a filling of the lock chamber 21 can fit between the filling level cone $F_1$ and the maximal filling level cone $F_{max}$. If the fluid level cone drops below $F_1$, then the upper filling level sensor 72 can activate a filling of the lock chamber 21 so that this is completely filled when the lower filling level sensor 74 signalizes the filling level cone $F_2$ and can herewith activate a refilling from the filled lock chamber 21 into the pressure tank 11. Herewith, one prevents the filling level cone from dropping to the minimal filling level cone $F_{min}$. At least a filling of the lock chamber 21 as a buffer can fit between the minimal filling level cone $F_{min}$ and the filling level cone $F_2$. As an alternative to an activating of the filling of the lock chamber 21 given a certain filling level, the lock chamber 21 can be automatically immediately filled again as soon as the refilling of the pressure tank 11 is completed. The refilling from the lock chamber 21 then only needs to be actuated at the filling level cone $F_2$. The vertical distance between the upper filling level sensor 72 and the lower filling level sensor 74 can be selected relative short, for example so short that a dropping between $F_1$ and $F_2$ lasts for a shorter period of time than a filling procedure of the lock chamber 21. Given a shorter vertical distance, the middle abrasive agent removal flow $\Delta V/\Delta t$ or $\Delta V(t_2-t_1)$ can be determined more frequently and herewith can more accurately represent the current abrasive agent removal flow dV/dt.

FIGS. 8 to 12 show different possibilities of bringing abrasive agent in a dry, wet, moist, suspended, frozen, pelleted or another form, into the refilling funnel 25 or directly into the filling valve 23. A preloading container 78, from which abrasive agent suspension is delivered into the refilling funnel 25 by way of a pump 80 is provided in FIG. 8. On loading the refilling funnel 25, water which is displaced by the sinking abrasive agent can run off via an overflow 82 on the refilling funnel.

Figure 9:
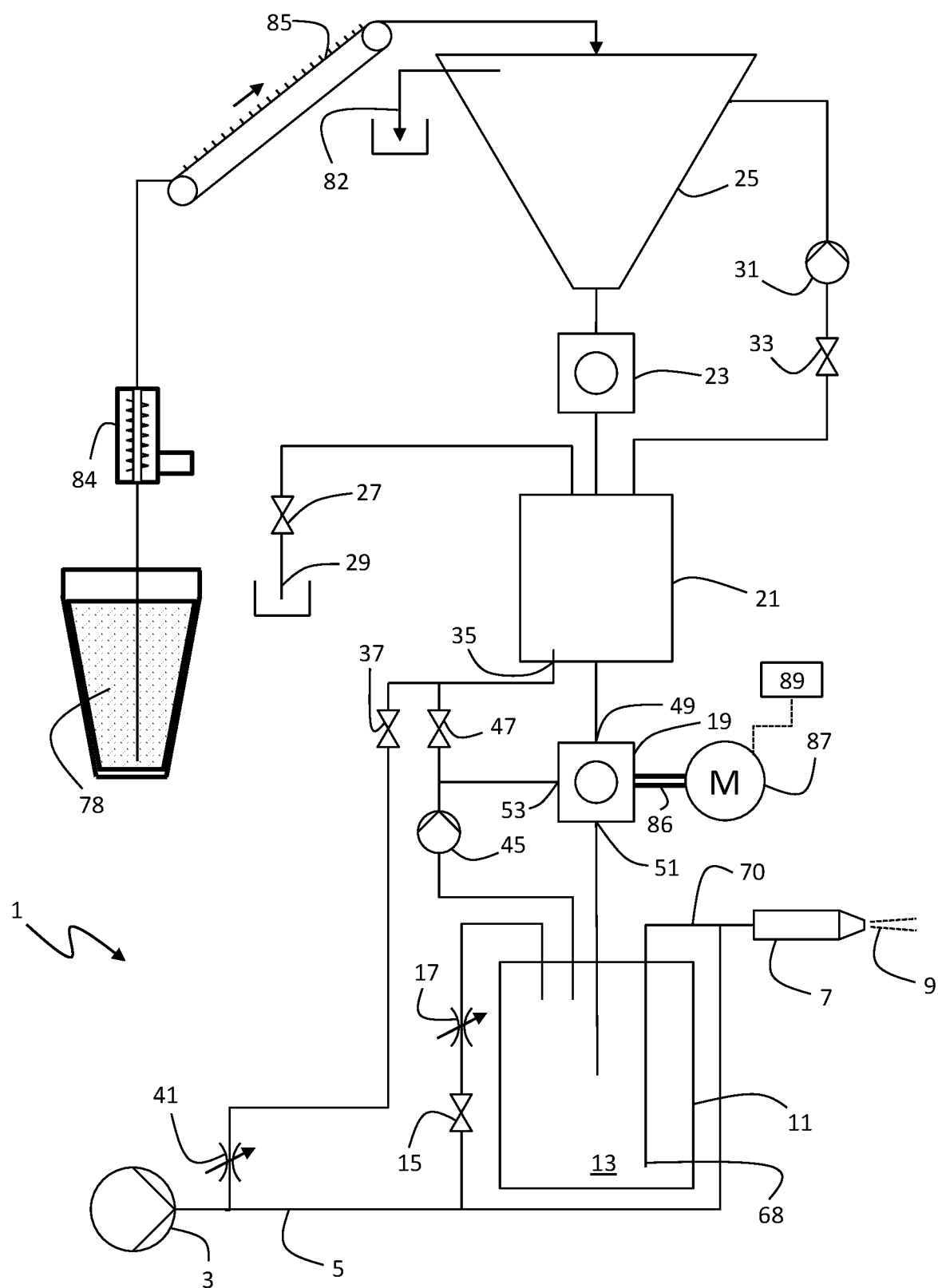
FIG. 9 is a schematic block diagram of a second embodiment of an abrasive agent refilling device of the water-abrasive suspension cutting facility which is disclosed herein.

A preloading container 78, from which dry, powder-like or moist lumpy abrasive agent is delivered into the refilling funnel 25 by way of a delivery screw 84 and/or a conveyor belt 85 is provided in FIG. 9. Here too, on loading the refilling funnel 25, water which is displaced by the sinking abrasive agent can run off via the overflow 82 on the refilling funnel 25. The abrasive agent can be recovered and processed from the waste water of the cutting jet 9 after a cutting process for example, so that it can be utilized for a further cutting process. The advantage of this facility compared to known water-abrasive suspension cutting facilities is that such a reprocessed abrasive agent does not need to be dried and can be filled into the facility in a moist-lumpy or arbitrary form.

Figure 10:
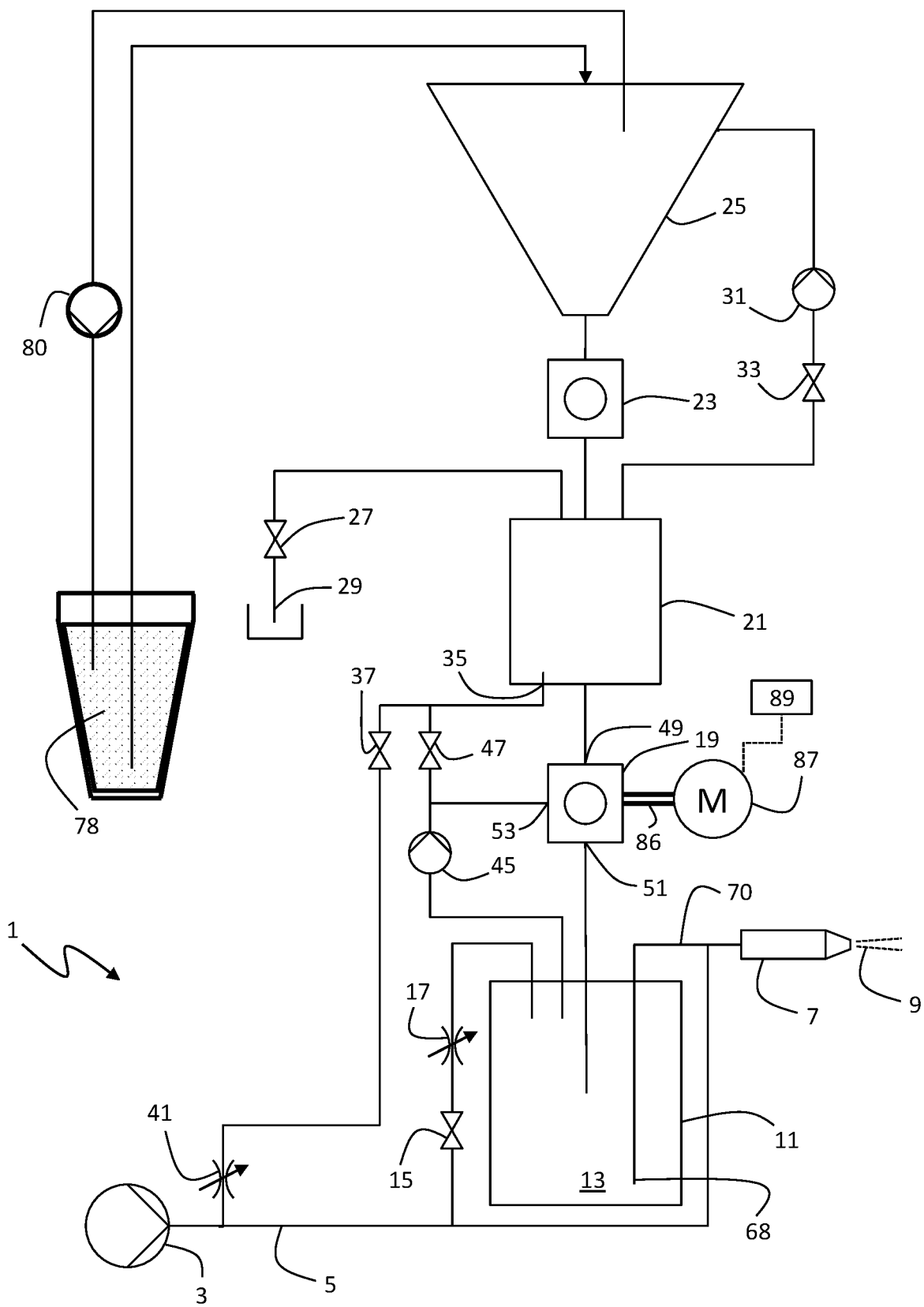
FIG. 10 is a schematic block diagram of a third embodiment of an abrasive agent refilling device of the water-abrasive suspension cutting facility which is disclosed herein.
Figure 11:
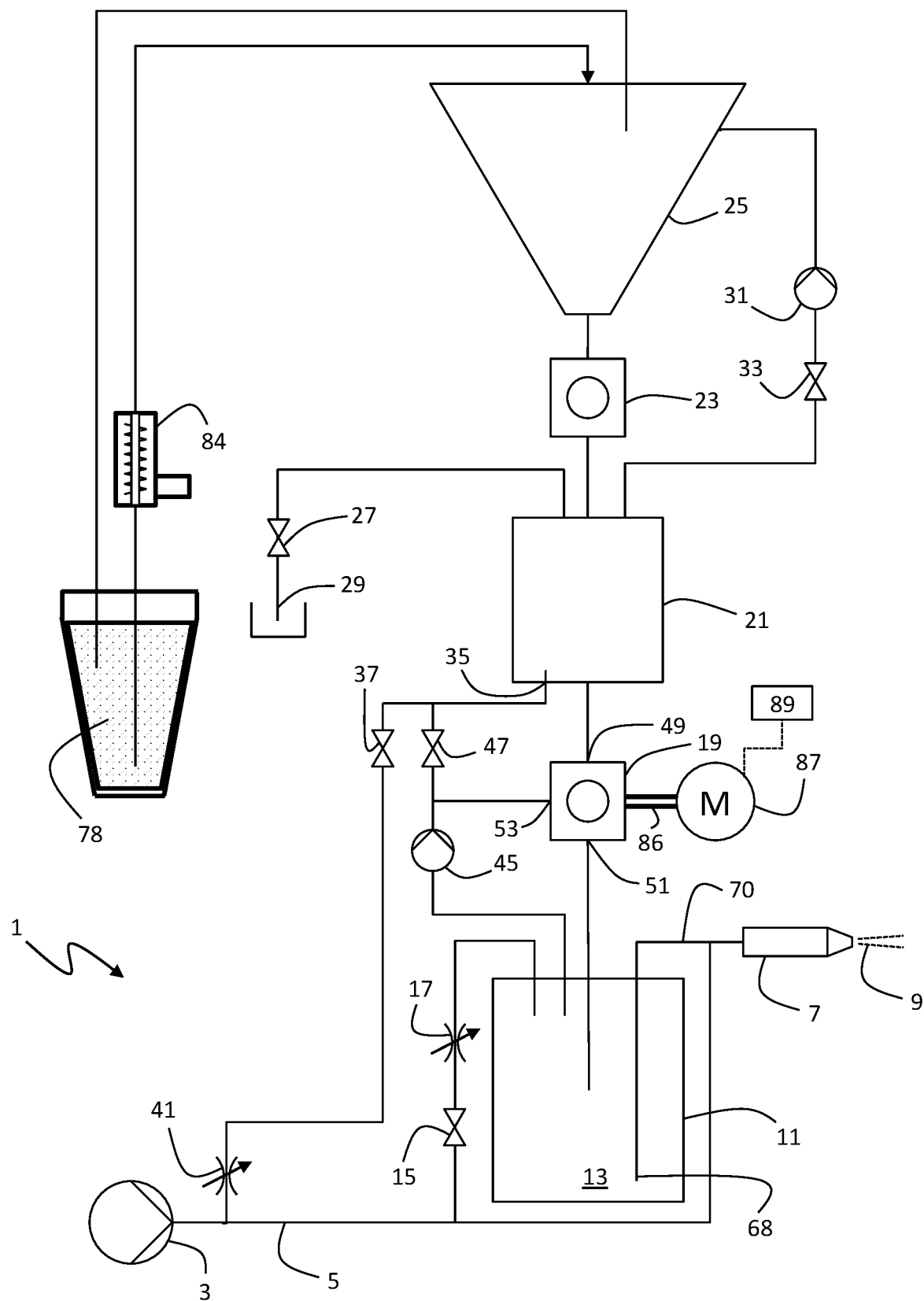
FIG. 11 is a schematic block diagram of a fourth embodiment of an abrasive agent refilling device of the water-abrasive suspension cutting facility which is disclosed herein.
Figure 12:
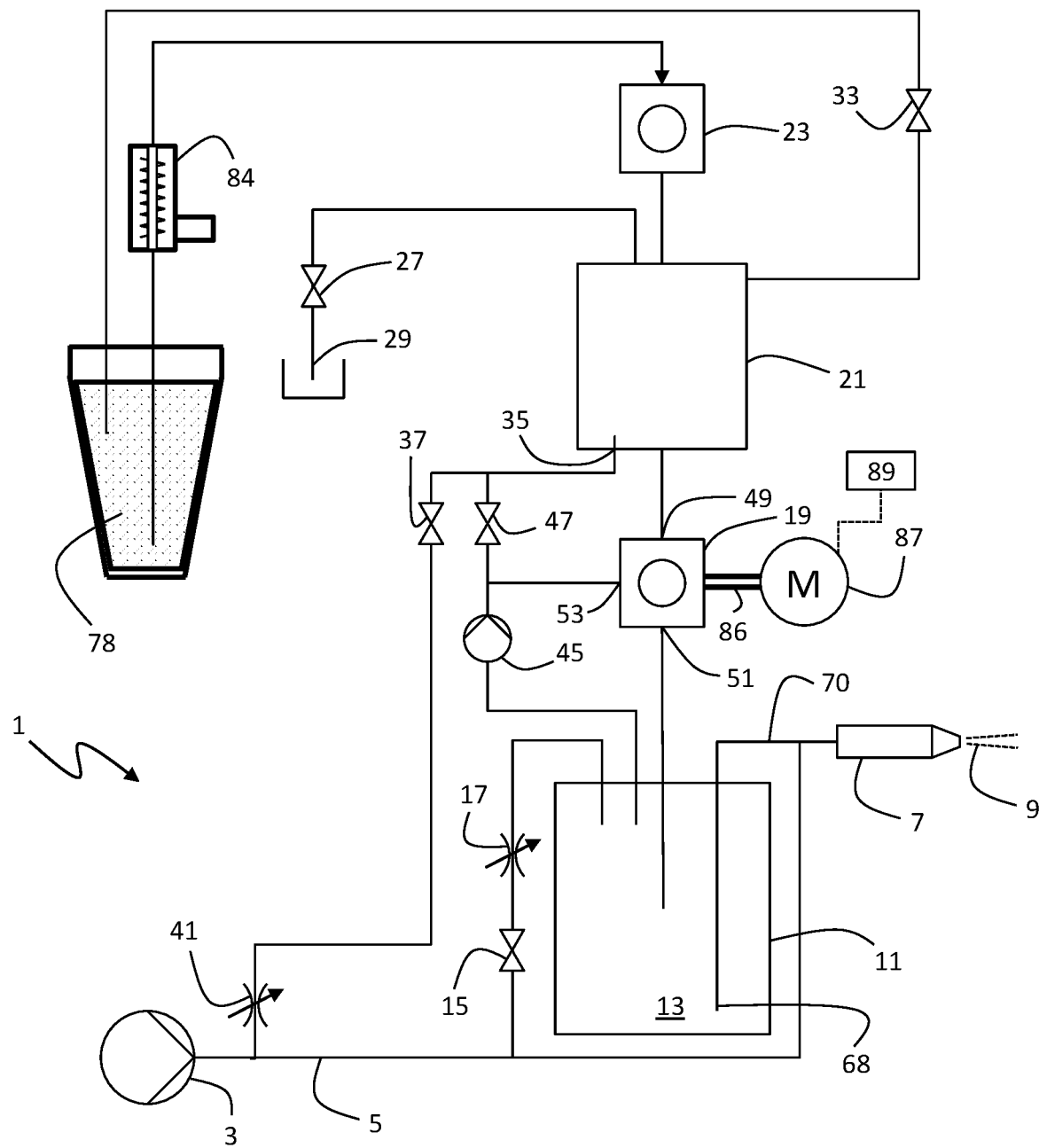
FIG. 12 is a schematic block diagram of a fifth embodiment of an abrasive agent refilling device of the water-abrasive suspension cutting facility which is disclosed herein.

No overflow 82 is provided in FIG. 10, but a circulation between the refilling funnel 25 and the preloading container 78, wherein the pump 80 at the exit side of the refilling funnel 25 drives the circulation for filling the refilling funnel 25 with abrasive agent. In this case, the refilling funnel 25 is preferably closed, so that the pump 80 can suck abrasive agent suspension out of the preloading container 78. Thereby, it is advantageous for the pump 80 to deliver relatively clean water and no saturated abrasive agent suspension as in FIG. 8. The wearing in the pump 80 is reduced by way of this. Furthermore, a sucking of the abrasive agent suspension is less prone to clogging than a pressurizing. As is shown in FIG. 11, a delivery screw 84 can however also be arranged at the entry side to the refilling funnel 25 in order to deliver abrasive agent into the refilling funnel 25. In particular, this is advantageous if no abrasive agent suspension is in the preloading container 78, but abrasive agent as a dry powder or in moist-lumpy form.

One can even completely forgo the refilling funnel 25 (see FIG. 12) if the delivery via a conveying screw 84 or a pump 80 takes place rapidly enough and directly into the filling valve 23 in a controlled manner. The water which is displaced by the abrasive agent on filling the lock chamber 21 can be led out of the lock chamber 21 back into the refilling funnel 25 via the pump shut-off valve 33. This can also be assisted by a pump 31 according to FIGS. 1 to 5, in order to additionally actively suck abrasive agent into the lock chamber 21.

Figure 13:
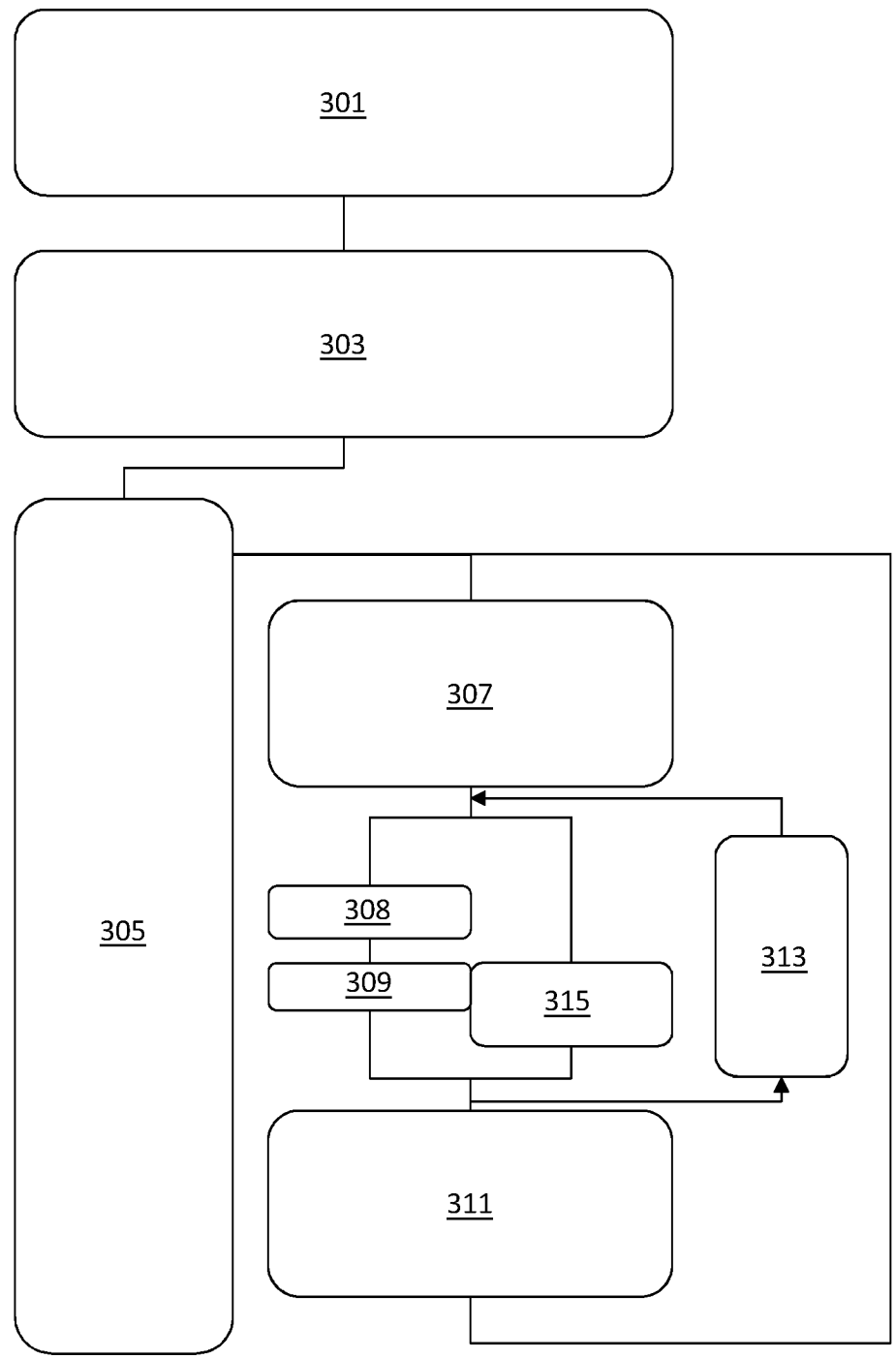
FIG. 13 is a schematic sequence diagram of an embodiment example of the method which is disclosed herein, for water-abrasive suspension cutting.

The refilling of the abrasive agent into the pressure tank 11 according to an embodiment example of the method which is disclosed herein, for water-abrasive suspension cutting, is effected in a portioned and cyclical manner, during which a workpiece which is to be machined can be continuously cut with the cutting jet 9. FIG. 13 illustrates the method steps in the temporal course. In a first step 301, water is provided at a high pressure in the high-pressure conduit 5 by way of the high-pressure source 3. Herewith, an abrasive agent suspension which is also under pressure is also provided 303 in the pressure tank 11. Herewith, a workpiece can already be cut 305 by way of the high-pressure jet 9 which at least partly comprises the abrasive agent suspension, whilst removing the abrasive agent suspension from the pressure tank 11. The steps 307 to 311 serve for the portioned and cyclical refilling of the pressure tank 11 with abrasive agent during the continuous cutting 305. The non-pressurized lock chamber 21 is firstly filled 307 with abrasive agent or with an abrasive agent suspension. During the filling, the delivery aid 45 is shut-off from the non-pressurized lock chamber 21 by way of the delivery aid shut-off valve 47. The pump 31 is then shut off 308 from the lock chamber 21. The lock chamber is subsequently at least partly pressurized 309 by way of pressure discharge of the pressure accumulator 39, and finally the pressure tank 11 is refilled 311 with abrasive agent or an abrasive agent suspension from the pressurized lock chamber 21 via the refilling valve 19. On refilling 311, the delivery aid 45 is fluid-connected to the pressurized lock chamber 21 via the opened delivery aid shut-off valve 47. After the refilling 311, the delivery aid shut-off valve 47 as well as the pressurization valve 37 and the refilling valve 19 are shut off in order to be able to pressure-relieve the lock chamber 21 into the discharge 29 via the pressure relief valve 27 for the next filling step.

The pressure accumulator can be charged in pressure 313 from the high-pressure conduit 5 via the throttle 41 during the filling 307 of the lock chamber 21 or during the refilling 311 of the pressure tank 11. Starting at the same time as the pressurizing 309 of the lock chamber 21 from the pressure accumulator 39, the lock chamber 21 can be at least partly pressurized 315 from the high-pressure conduit 5 via the throttle 41. This slow throttled pressurizing 315 from the high-pressure conduit can last longer than the rapid pressurizing 309 by way of the pressure discharge of the pressure accumulator 39. In other words, the pressurizing 309 of the lock chamber 21 by way of the pressure discharge of a pressure accumulator 39 can be effected during a first time window A and the pressurizing 315 of the lock chamber 21 from the high-pressure conduit 5 can be effected during a second time window B, wherein the first time window A and the second time window B at least partly overlap, preferably at their beginning.

The pressurizing 309 of the lock chamber 21 by pressure discharge of the pressure accumulator can be effected so rapidly, that abrasive agent which is located in the lock chamber 21 is loosened up by a pressure impulse. Herein, the pressurizing 309 of the lock chamber by way of pressure discharge of the pressure accumulator 39 is preferably effected in a lower region of the lock chamber 21, since any clogging of abrasive agent is more probable in a lower region than in an upper region.

Optionally, the pressurization entry 35 of the lock chamber 21 can be shut off from the pressure accumulator 39 and/or from the high-pressure conduit 5 during the filling 307 and the refilling 311. The pressurizing 313 of the pressure accumulator 39 can hence be effected during the filling 307 and/or the refilling 311. Herein, energy can be stored via a spring compression or fluid compression in the pressure accumulator 39 which can be designed for example as a spring accumulator or bubble accumulator. The filling 307, the pressurizing 309 and the refilling 311 can take their course cyclically, whereas the cutting 305 can be carried out continuously.

Optionally, after pressurizing 309 the lock chamber 21 by way of pressure discharge of the pressure accumulator 39, the pressure accumulator 39 can firstly be shut off from the high-pressure conduit 5 by way of a pressure accumulator valve 43. Preferably, the pressure accumulator valve 43 can only be opened again for charging the pressure accumulator 39 in pressure, when the lock chamber 21 has been pressurized from the high-pressure conduit 5 via the throttle 41.

Figure 14:
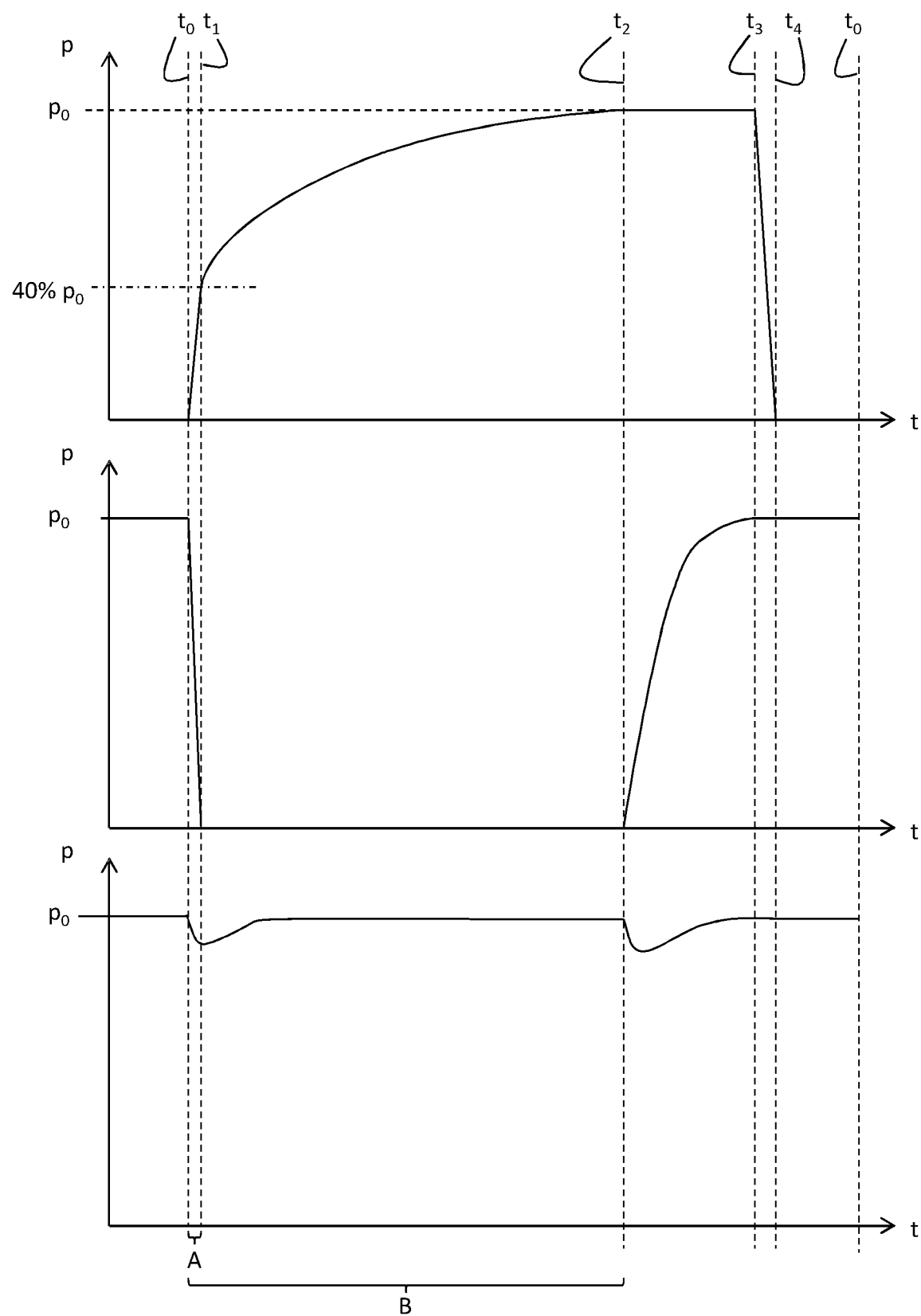
FIG. 14 is a view of pressure-time diagrams in a lock chamber, in a pressure tank and in a high-pressure conduit, according to an embodiment example of the water-abrasive suspension cutting facility which is disclosed herein.

FIG. 14 illustrates an exemplary course of the pressure p over time t in the lock chamber 21 (at the top), in the pressure accumulator 39 (in the middle) and in the high-pressure conduit 5 (at the bottom). The pressure in the non-pressurized lock chamber 21 is firstly the ambient pressure which here lies on the axis line. The lock chamber 21 can be filled 307 in this non-pressurized phase before the start of the pressuring 309 at the point in time $t_0$.

The pressurizing 309, 315 begins at the point in time $t_0$. During the first short time window $A=t_1-t_0$, the lock chamber 21 is now pressurized 309 to up to 40% of the nominal high pressure $p_0$ from the pressure discharge of the pressure accumulator 39. The pressure accumulator 39 is then relieved down to a minimum at $t_1$ and is subsequently shut off via the pressure accumulator valve 43 according to the second embodiment example in FIG. 2. The lock chamber 21 however continues to be slowly pressurized 315 within the second longer time window $B=t_2-t_0$ from the high-pressure conduit 5 via the throttle 41 until the nominal high pressure $p_0$ is reached at $t_2$. The pressurizing 309, 315 of the lock chamber 21 can last 5 to 10 seconds. The refilling 311 can begin as soon as the nominal high-pressure $p_0$ in the lock chamber 21 is reached at $t_2$ and the pressure accumulator 39 can be simultaneously charged in pressure 313 again. In the embodiment according to FIG. 3 without a pressure accumulator 39, the lock chamber 21 is completely pressurized from the high-pressure conduit 5 via the throttle 41 beyond the time window B.

The refilling valve 19 is opened between $t_2$ and $t_3$, so that abrasive agent can flow into the pressure tank 11. At the point in time $t_3$, the abrasive agent has completely flowed out of the lock chamber 21 into the pressure tank 11 and the refilling step 311 is completed. For filling 307, the pressure can be relieved from the lock chamber 21 into the discharge 29 via the pressure relief valve 27 in a relatively rapid manner until at $t_4$ lower pressure again prevails in the lock chamber 21. A new refilling cycle beginning with the filling 307 of the lock chamber 21 can then start. The pressure accumulator 39 is charged in pressure again from the high-pressure conduit 5 in a slow and throttled as possible manner from $t_2$, so as to be fully charged in pressure again at $t_0$ for the pressurizing 309. The lower graph shows the pressure drop in the high-pressure conduit 5 on opening the pressurization valve 37 at $t_0$ and the pressure accumulator valve 43 at $t_2$. The amplitude of the pressure drop in each case is reduced via the throttle 41 to an amount, with regard to which the cutting performance of the cutting jet 9 is not significantly compromised.

Figure 15A:
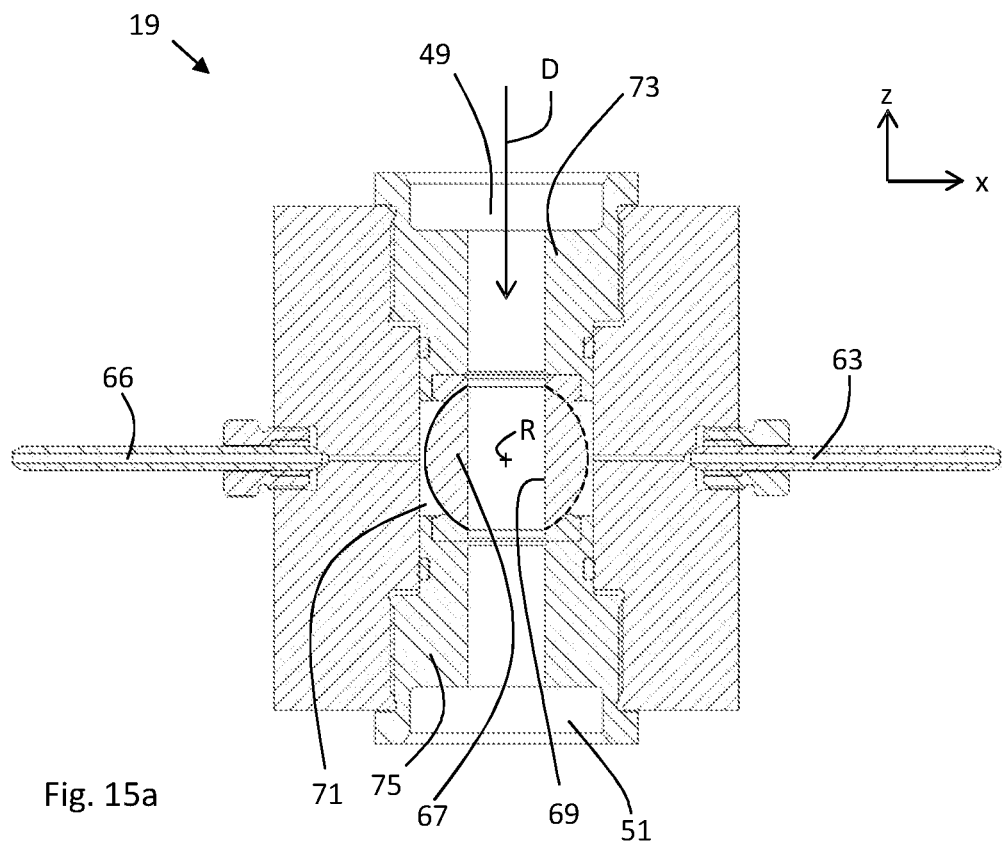
FIG. 15a is a cross sectional view in an xz-plane through a refilling valve in one open position, according to an embodiment example of the water-abrasive suspension cutting facility which is disclosed herein.
Figure 15B:
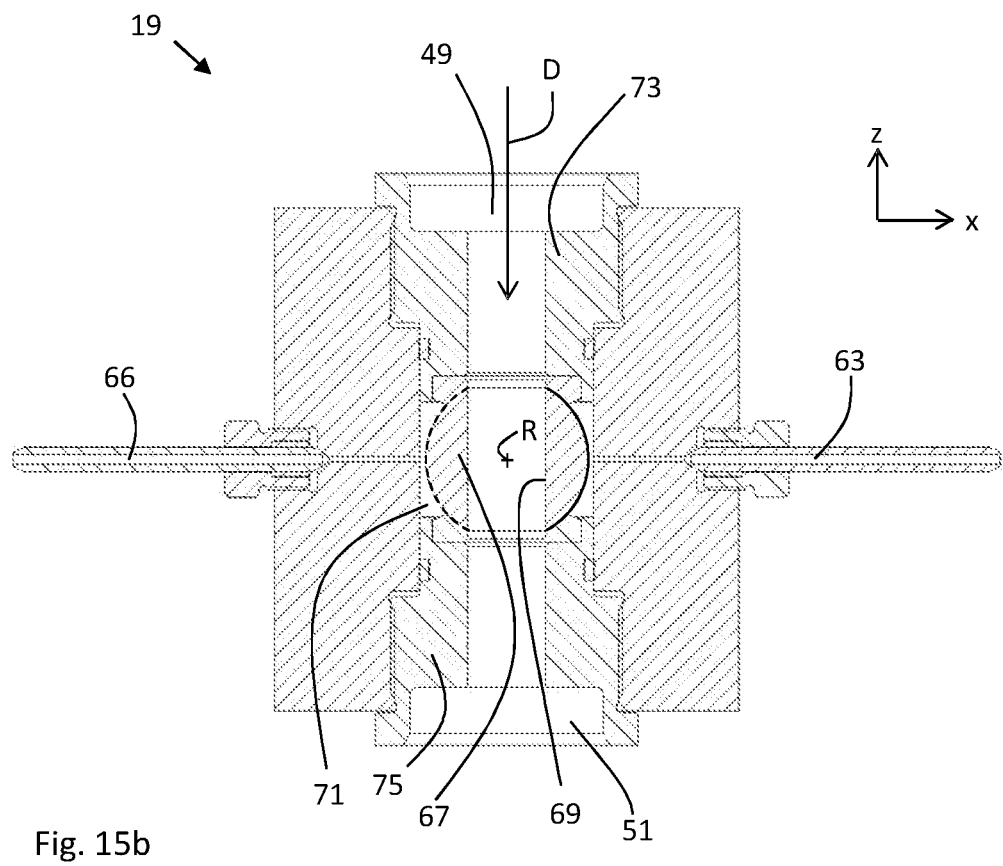
FIG. 15b is a cross sectional view in an xz-plane through a refilling valve in another open position, according to an embodiment example of the water-abrasive suspension cutting facility which is disclosed herein.

In FIGS. 15a and 15b, the refilling valve 19 is shown in cross section in a more detailed manner, each in different open positions. Since the refilling valve 19 needs to be actuated at high pressure at the valve entry 49 and the valve exit 51, the trouble-free actuation of the refilling valve 19 is a technical challenge. The reliable opening and closing of the refilling valve 19 is now ensured by way of four sub-aspects which each on its own or in an arbitrary combination of two, three or all four sub-aspects contribute to the refilling valve 19 not clogging or being blocked by the abrasive agent.

The refilling valve 19 which is preferably designed as a ball cock has a vertical throughflow direction D from the top to the bottom and comprises a centrally arranged valve body 67 with spherical outer surfaces, said valve body being rotatable about a rotation axis R which is perpendicular to the throughflow direction D. The valve body 67 comprises a centric through-hole 69 which in the open positions which are shown in FIG. 15a and FIG. 15b runs parallel to the throughflow direction D and perpendicular to the rotation axis R. The first open position according to FIG. 15a differs from the second open position according to FIG. 15b in that the valve body 67 is rotated by 180° with respect to the rotation axis R. The valve body 67 is seated in a valve space 71 between an upper valve seat 73 and a lower valve seat 75. The upper valve seat 73 forms the valve entry 49 and the lower valve seat 75 the valve exit 51 The upper valve seat 73 and the lower valve seat 75 are arranged coaxially to one another and to the vertical throughflow direction D. The valve space 71 can be purged via the lateral purge inlet 66 and via the purge outlet 63 which lies diametrically opposite the purge inlet 66, preferably given a completely pressureless refilling valve 19.

Figure 16A:
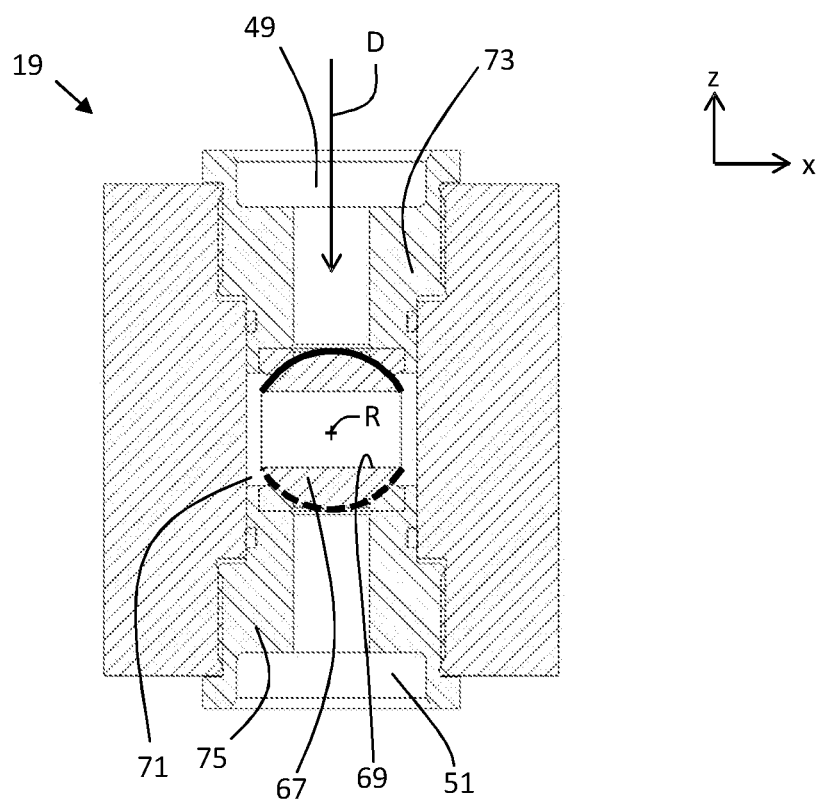
FIG. 16a is a cross sectional view in an xz-plane through a refilling valve in one closure position, according to an embodiment example of the water-abrasive suspension cutting facility which is disclosed herein.
Figure 16B:
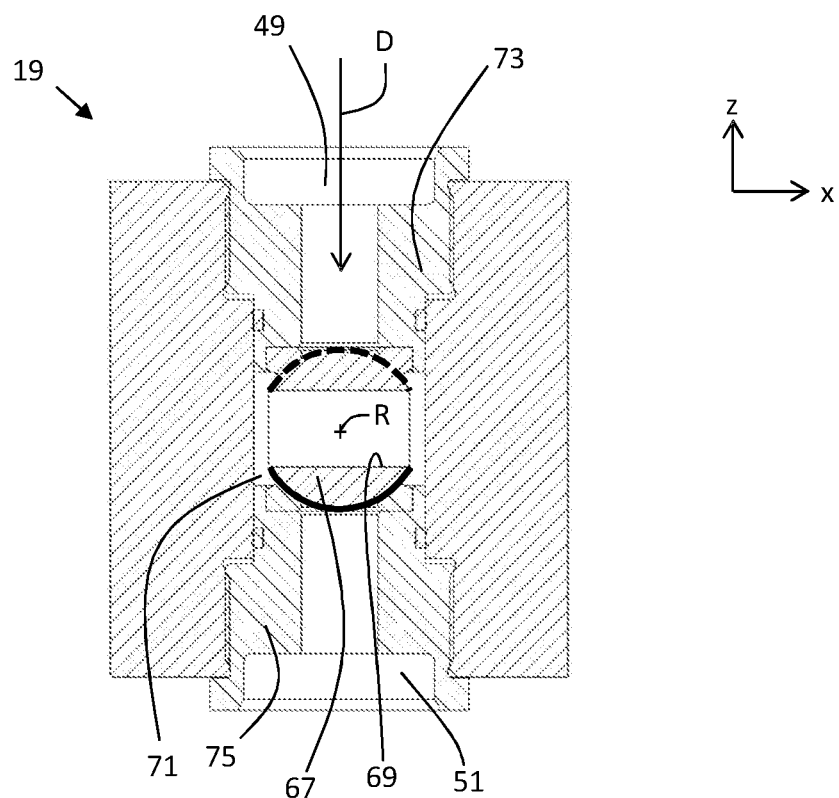
FIG. 16b is a cross sectional view in an xz-plane through a refilling valve in another closure position, according to an embodiment example of the water-abrasive suspension cutting facility which is disclosed herein.

According to the first sub-aspect, the refilling valve 19 is in the position of assuming a first closure position (FIG. 16*a*), a first open position (15*a*) and a second open position (FIG. 15*b*), wherein in the first closure position (FIG. 16*a*) the lock chamber 21 is fluid-separated from the pressure tank 11 and in the first and well as the second open position (FIG. 15*a-b*) the lock chamber 21 is fluid-connected to the pressure tank 11. The first open position and the second open position can hardly be differentiated from one another due to the symmetry of the valve body 67. The valve body 67 can be rotated about the rotation axis R in one direction to an infinite extent, so that a reversal of the rotation direction is basically not necessary and the valve body 67 can be activated exclusively in one rotation direction, inasmuch as the torque which is required for this does not exceed a certain threshold. The first closure position of FIG. 16*a* here lies at 90° between the first open position and the second open position. In this case, there is also a second closure position (see FIG. 16*b*) which is rotated about the rotation axis R by 180° with respect to the first closure position. In the closure positions which are shown in FIG. 16*a* and FIG. 16*b* the through-hole 69 runs perpendicularly to the throughflow direction D as well as perpendicularly to the rotation axis R, so that the valve body 67 seals off the valve entry 49 on the upper valve seat 73 and the valve exit 51 on the lower valve seat 75. Here the optional purge inlet 66 and purge outlet 63 are not shown, but can be provided. Herewith, there are therefore always two possibilities for movement direction, of opening and closing the refilling valve 19 towards the first open position/closure position respectively or to the second open position/closure position respectively, should one movement direction momentarily demand too high a torque. If therefore one movement direction is clogged or blocked, then the valve body 67 can be moved in the other movement direction and the valve 19 can be brought into the other open position/closure position. Herein, the clogging or blockage can be released by the reversal as a positive auxiliary effect, so that the previously blocked movement direction is free again given the next actuation. The refilling valve 19 can also be shaken free by way of a repeated to and fro rotation, for example should the valve body 67 be difficult to actuate in both movement directions.

Figure 17A:
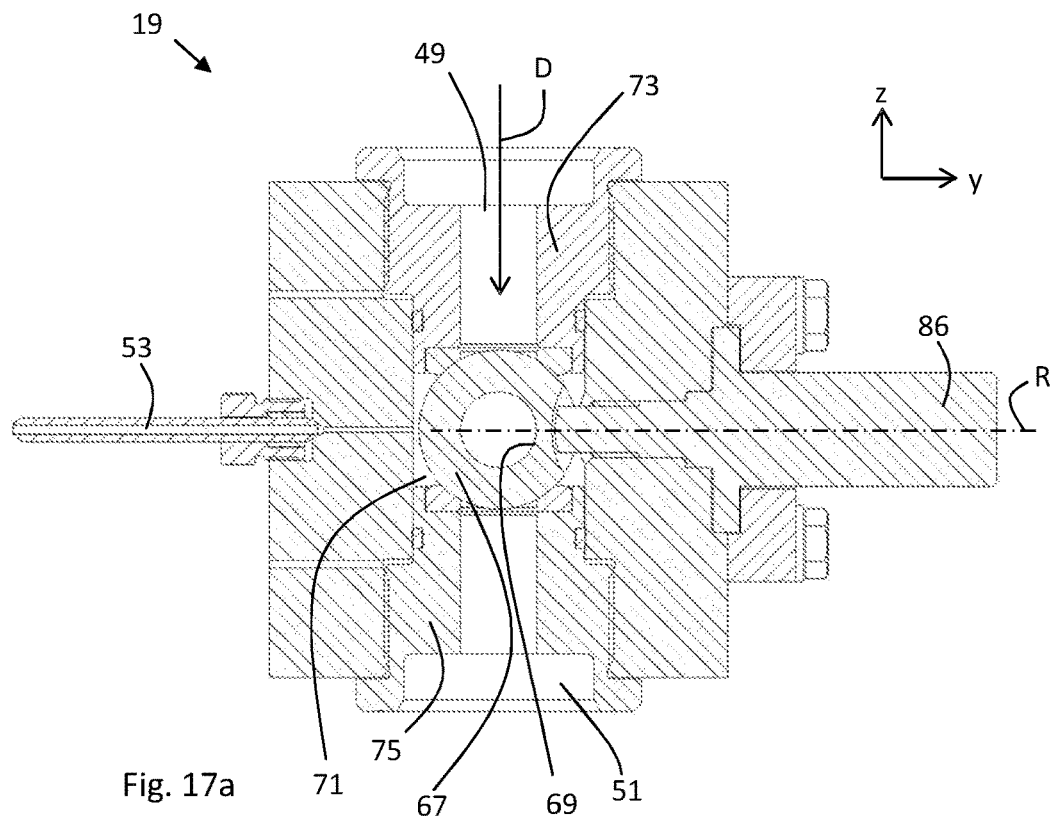
FIG. 17a is a cross sectional view in a yz-plane through a refilling valve in a closure position, according to one embodiment example of the water-abrasive suspension cutting facility which is disclosed herein.
Figure 17B:
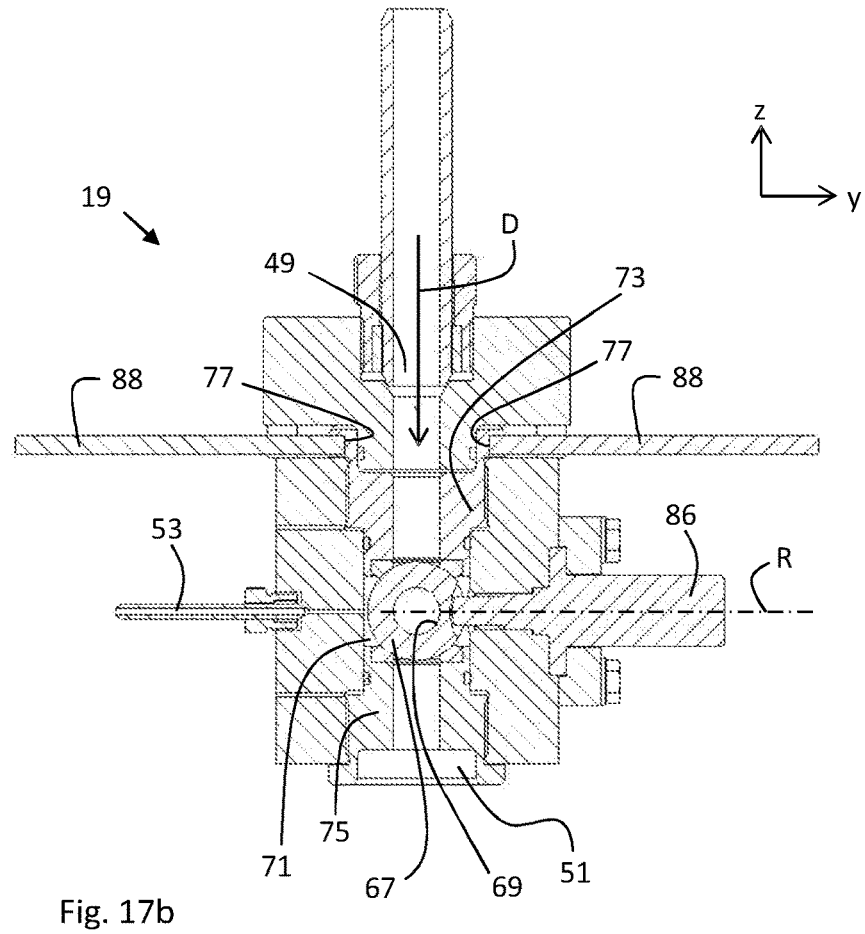
FIG. 17b is a cross sectional view in a yz-plane through a refilling valve in a closure position, according to another embodiment example of the water-abrasive suspension cutting facility which is disclosed herein.

According to the second sub-aspect, the valve space 71 can be pressurized in a closure position of the valve body 67. For this, according to FIG. 17*a-b*, the valve space 71 comprises the pressure inlet 53, via which the valve space 71 can be pressurized in a closure position of the valve body 67. The pressure inlet 53 here is arranged in the yz-plane coaxially to a servomotor shaft 86 in a manner lying opposite this. Alternately to this, the pressure inlet 53 can also lie in the xz-plane which is perpendicular thereto and possibly be used as a purge inlet 66 when required. The valve body 67 is rotated about the rotation axis R via the servomotor shaft 86. On starting operation or restarting operation of the facility 1 which is firstly without pressure, the valve space 71 is initially pressureless. If the pressure tank 11 and the lock chamber 21 are then pressurized to about 2,000 bar, then the valve body 67 can be jammed in by the valve seats 73, 75 due to the high pressure at the entry side as well as exit side given a simultaneous low pressure in the valve space 71 and can be difficult to move or not able to move at all. By way of the pressure inlet 53, the pressure difference between the valve space 71 and the valve entry 49 or the valve exit 51 can be largely reduced on starting operation, so that the valve body 67 is not jammed by the high pressure. In FIG. 17*b*, the upper valve seat 73 is shown in an adjustable manner via an adjusting device, in accordance with the fourth sub-aspect. The upper valve seat 73 is herein positionable in the z-direction via an outer thread by way of a rotation about the throughflow direction D. The rotation can be carried out manually by way of levers 88 which engage from the outside into engagement surfaces 77 or in a motor-driven manner.

According to the third sub-aspect, the valve space can be purged as is shown for example in FIG. 15*a-b*. Herein, the refilling valve comprises the purge inlet 66 and the purge outlet 63, via which the valve space 71 can be purged. The pressure inlet 53 can herein selectively serve as a purge inlet 66. This is particularly advantageous in combination with the second sub-aspect of a pressure inlet 53, since a purging procedure can be carried out given a pressureless valve space 71 or a completely pressureless facility 1 and subsequently on restarting operation of the facility 1, the valve space 71 can be pressurized again via the pressure inlet 53, so that the valve body 67 does not become jammed due to the high pressure.

Figure 18A:
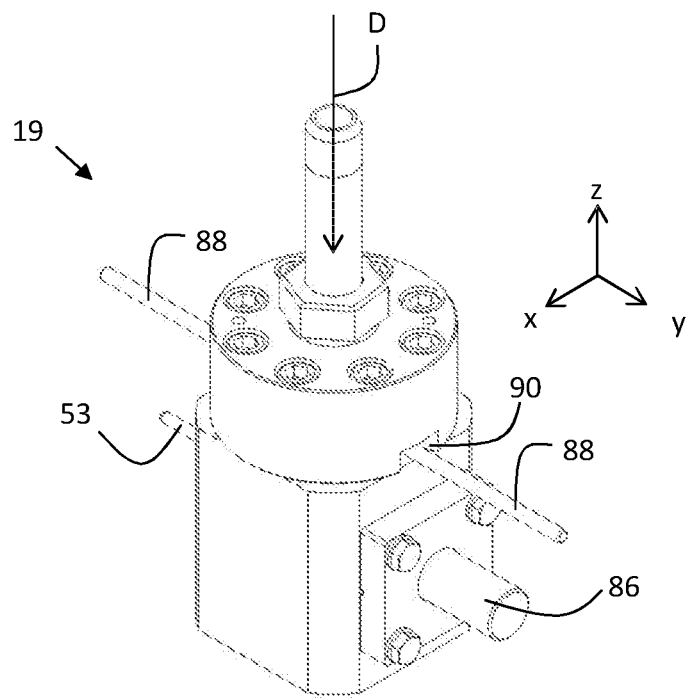
FIG. 18a is a perspective view of a refilling valve according to an embodiment example of the water-abrasive suspension cutting facility which is disclosed herein.
Figure 18B:
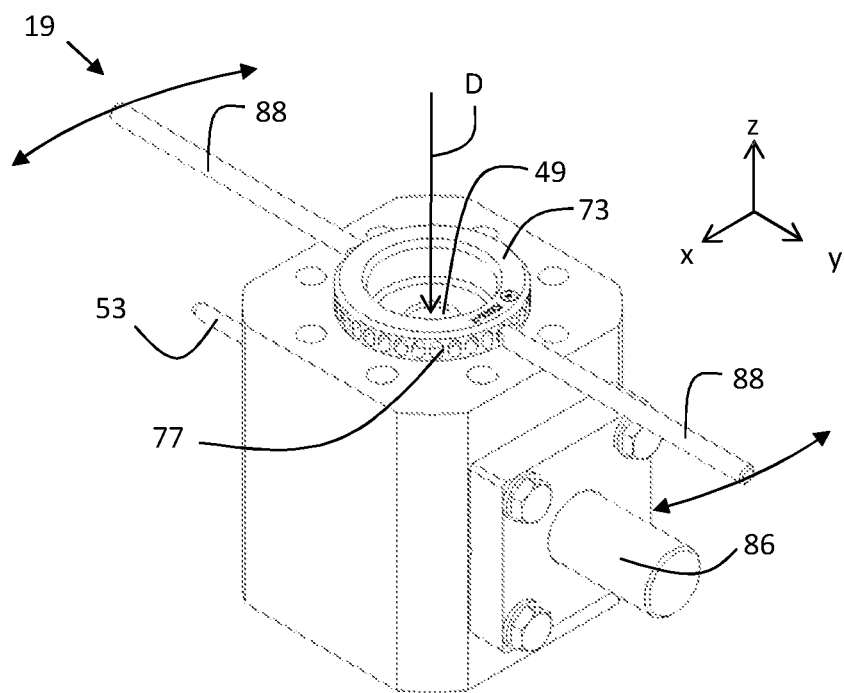
FIG. 18b is a perspective view of a refilling valve according to an embodiment example of the water-abrasive suspension cutting facility which is disclosed herein.

According to the fourth sub-aspect, the refilling valve comprises the entry-side upper valve seat 73 and the exit-side lower valve seat 75, wherein at least one of the valve seats 73, 75 is adjustable, so that the distance of the valve seats 73, 75 to one another can be adjusted. The refilling valve 19 can hence be adjusted in an optimal manner, in order on the one hand to be sealed and on the other hand not to block. On starting operation of the facility, given temperature fluctuations, given a stubborn blockage due to abrasive agent and/or material wear, a readjustment of the distance of the valve seats 73, 75 to one another can be advantageous. In order not to have to switch off or disassemble the facility for this, a tool opening 90, through which a tool in the form of a lever 88 can engage in order to adjust the at least one adjustable valve seat, can be provided as is shown in FIG. 18*a*. Preferably however, the adjustment of the valve seat 73 is carried out in a service procedure given a pressureless facility 1. In this example, the upper entry-side valve seat 73 is axially adjustable along the throughflow direction D via an outer thread. Levers 88 can be applied from the outside onto engagement surfaces 77 (see FIG. 18*b*) which are arranged at the peripheral side, in order to rotate the valve seat 73. The refilling valve 19 does not therefore need to be separated or disassembled from the facility 1. The operating person can hence immediately manually intervene, in order to ensure a continuous operation or to switch off or depressurize the facility 1, in order to carry out the adjustment of the valve seat 73 as a service procedure. Alternatively or additionally, the readjusting can also be effected in an automatically controlled and/or regulated manner via a motor.

The valve body 67 is preferably rotated about the rotation axis R in a controlled manner via a servomotor 87. Herein, the possibly measured torque or power uptake of the motor can be monitored via a monitoring unit 89, so that the rotation direction can be reversed to the other open position or closure position on exceeding a threshold value. Alternatively or additionally, torque or power peaks can be recorded over a certain time period and an error occurrence or maintenance case can be signalized on the basis of this recording. For example, the necessity for readjusting the valve seat 73 can be displayed.

Figure 19A:
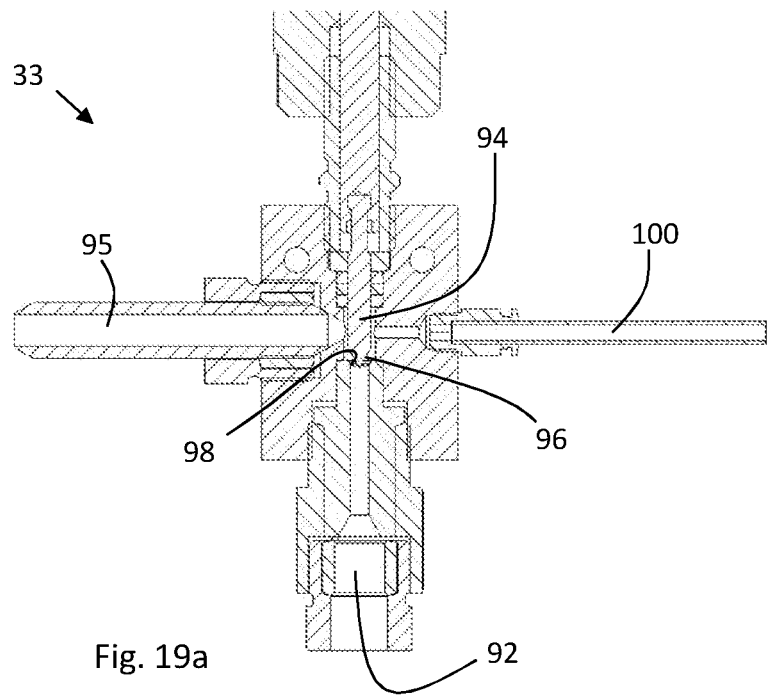
FIG. 19a is a cross sectional view through a shut-off valve in the form of a needle valve according to one embodiment example of the water-abrasive suspension cutting facility which is disclosed herein, in an open position.
Figure 19B:
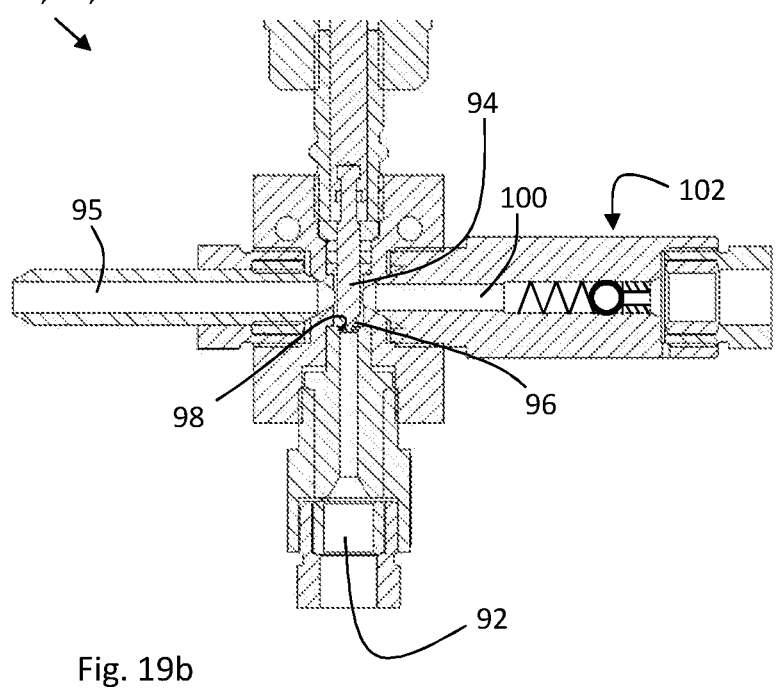
FIG. 19b is a cross sectional view through a shut-off valve in the form of a needle valve according to another embodiment example of the water-abrasive suspension cutting facility which is disclosed herein, in an open position.

FIG. 19*a-b* show two embodiments of purgable needle valves which can be used for example as one or more of the shut-off valves 15, 27, 33, 37, 47 or at another location in the facility 1. The needle valve according to FIG. 19*a* is preferably applied where the needle valve does not need to open or close under high pressure, e.g. as a pump shut-off valve 33 in the circuit for assisting the filling of the lock chamber 21. The pump shut-off valve 33 herein comprises a high-pressure entry 92 which with a needle 94 which is arranged coaxially to the high-pressure entry 92 and is axially positionable can be shut off with respect to a low-pressure exit 95. The needle 94 at an end which faces the high-pressure entry 92 comprises a conical closure surface 96 which can be pressed against a valve seat 98 for shutting off. As soon as the high-pressure entry 92 is shut off, one can apply high pressure to the high-pressure entry 92 without this escaping via the low-pressure exit 95. If no high pressure prevails at the high-pressure entry 92, then the pump shut-off valve 33 can be opened in order to permit a throughflow from the high-pressure entry 92 to the low pressure exit 95 given low pressure.

The needle valve according to FIG. 19a-b also comprises a purge inlet 100, via which the opened needle valve can be purged, wherein purging fluid, i.e. water or water with cleaning additives can flow out via the low-pressure exit 95. In particular, the valve seat 98 and the closure surface 96 can be freed of abrasive agent residues by way of the throughflow of purging fluid, in order to ensure a clean closure amid as little material wear as possible. Preferably, the needle valve can be purged shortly before a closure procedure of the refilling valve 19. FIG. 19b shows a needle valve with a check valve 102 at the purge inlet 100. The check valve 102 prevents a backflow into the purge inlet 100 and only permits a flow of purging fluid in the direction of the needle valve. This is useful if the needle valve is used for example as one or more of the shut-off valves 15, 27, 37, 47, since the valve is opened there when high pressure prevails at the high-pressure entry 92. Without the check valve 102, this high pressure would at least partly discharge into the purge inlet 100 and lead to a backflow into the purge inlet 100. The check valve 102 prevents this and hence permits a clean pressure relief via the low-pressure exit 95. The low-pressure exit 95 can also be a high-pressure exit 95 in this case. For example, the low-pressure exit 95 is connected to a discharge 29 in the case of a pressure relief valve 27. In the case of the pressurization valve 37, the high-pressure exit 95 is however connected to the pressurization entry 35 of the lock chamber 21, in order to subject this to high pressure.

The needle valves are preferably operated pneumatically via a pressing disc (not shown). In order to be able to counteract the high pressure which acts upon the needle tip in the form of a conical closure surface 96, an air pressure can be applied onto the very much larger pressing disc, so that the needle valve can be closed and held in a sealed manner against a high pressure of 1,500 bar and more with a few bars of air pressure.

The numbered indications of the components or movement directions as "first", "second", "third" etc. have herein been selected purely randomly so as to differentiate the components or the movement directions amongst one another, and can also be selected in an arbitrarily different manner. Hence these entail no hierarchy of significance.

While specific embodiments of the invention have been shown and described in detail to illustrate the application of the principles of the invention, it will be understood that the invention may be embodied otherwise without departing from such principles.

The invention claimed is:

1. A water-abrasive suspension cutting facility, comprising:
   a pressure tank for providing a water-abrasive agent suspension which is under pressure;
   a lock chamber; and
   a refilling valve for refilling abrasive agent into the pressure tank via the lock chamber, wherein the refilling valve comprises a valve entry, a valve exit, a valve space arranged between the valve entry and the valve exit, and a valve body located in the valve space, wherein the valve entry is connected to the lock chamber and the valve exit to the pressure tank, the refilling valve comprising a first closure position, a first open position and a second open position, wherein the lock chamber is fluid-separated from the pressure tank in the first closure position and the lock chamber is fluid-connected to the pressure tank in the first open position and the second open position, wherein the valve space comprises a pressure inlet, via which the valve space is configured be pressurized in the closure position of the valve body, wherein the pressure inlet is connected to a pressure conduit that pressurizes the pressure tank and/or the lock chamber.

2. A water-abrasive suspension cutting facility according to claim 1, wherein the valve body is configured to be brought from the first closure position into the first open position via a rotation in a first direction and into the second open position via a rotation in a second direction.

3. A water-abrasive suspension cutting facility according to claim 2, wherein the valve body comprises a second closure position, wherein the valve body is configured to be brought from the second closure position into the second open position via the rotation in the first direction and into the first open position via the rotation in the second direction.

4. A water-abrasive suspension cutting facility according to claim 2, wherein the valve body is configured to be brought from the first open position into the second open position by a 180° rotation.

5. A water-abrasive suspension cutting facility according to claim 1, wherein the refilling valve is a ball cock, wherein the valve body is spherical with an axial through-hole, wherein the valve entry and the valve exit are arranged on diametrically opposite sides of the valve body, wherein the axial through-hole lies coaxially to the valve entry and the valve exit in the first open position and the second open position.

6. A water-abrasive suspension cutting facility according to claim 5, wherein the valve body is rotatable about a rotation axis which is perpendicular to the axial through-hole.

7. A water-abrasive suspension cutting facility according to claim 1, wherein the valve body is controllably drivable via a motor.

8. A water-abrasive suspension cutting facility according to claim 7, wherein one or more of a drive direction, a drive speed and a drive moment of the motor are regulated depending on a torque required for driving the valve body or on at least one parameter which correlates with the torque.

9. A water-abrasive suspension cutting facility according to claim 8, wherein a power consumption of the motor is one of the at least one parameter which correlates with the torque.

10. A water-abrasive suspension cutting facility according to claim 8, wherein the motor is regulated such that the drive direction is changed on exceeding a threshold for the torque required for driving the valve body or on exceeding a threshold for the at least one parameter which correlates with the torque.

11. A water-abrasive suspension cutting facility according to claim 8, wherein the refilling valve comprises a second closure position between the second open position and the first open position, wherein the motor is regulated such that the drive direction remains the same when a threshold value for the torque required for driving the valve body is not exceeded or a threshold for the at least one parameter which correlates with the torque is not exceeded.

12. A water-abrasive suspension cutting facility according to claim 7, further comprising a monitoring unit configured to monitor a torque required for driving the valve body or at least one parameter which correlates with the torque, over at least one time window in a continuous or discrete manner, in order to detect wearing or to indicate an error occurrence or a service case.

13. A water-abrasive suspension cutting facility according to claim 1, wherein the valve space comprises a purge inlet and a purge outlet, via which the valve space can be purged, the purge inlet and the purge outlet being located at a spaced location from the pressure inlet.

14. A water-abrasive suspension cutting facility according to claim 13, wherein the purge outlet is closable via a purge outlet valve and the valve space is configured to be pressurized via the purge inlet when the purge outlet valve is closed.

15. A water-abrasive suspension cutting facility according to claim 1, wherein the refilling valve comprises an entry-side valve seat and an exit-side valve seat, wherein at least one of the entry-side valve seat and the exit-side valve seat is adjustable so that a distance of the entry-side valve seat and the exit-side valve seat to one another is adjustable.

16. A water-abrasive suspension cutting facility according to claim 15, wherein the refilling valve comprises a tool opening, through which a tool can engage, in order to adjust the at least one of the entry-side valve seat and the exit-side valve seat.

17. A water-abrasive suspension cutting facility according to claim 16, wherein the at least one of the entry-side valve seat and the exit-side valve seat is rotatable via the tool which is introduced through the tool opening, and is axially adjustable via a thread, the tool comprising a lever or key.

18. A water-abrasive suspension cutting facility according to claim 1, wherein the valve entry is arranged at an upper side and the valve exit at a lower side of the refilling valve, wherein the lock chamber is arranged above the refilling valve and the pressure tank is arranged below the refilling valve, so that abrasive agent can flow through the refilling valve assisted or driven by gravity.

19. A water-abrasive suspension cutting facility, comprising:
 a pressure tank for providing a water-abrasive agent suspension which is under pressure;
 a lock chamber; and
 a refilling valve for refilling abrasive agent into the pressure tank via the lock chamber, wherein the refilling valve comprises a valve entry, a valve exit, a valve space arranged between the valve entry and the valve exit, and a valve body located in the valve space, wherein the valve entry is connected to the lock chamber and the valve exit to the pressure tank, the refilling valve comprising a first closure position, a first open position and a second open position, wherein the lock chamber is fluid-separated from the pressure tank in the first closure position and the lock chamber is fluid-connected to the pressure tank in the first open position and the second open position, wherein the valve space comprises a pressure inlet, via which the valve space is configured be pressurized in the closure position of the valve body, wherein the valve space comprises a purge inlet and a purge outlet, via which the valve space can be purged, the purge inlet and the purge outlet being located at a spaced location from the pressure inlet.

20. A water-abrasive suspension cutting facility according to claim 19, wherein the purge outlet is closable via a purge outlet valve and the valve space is configured to be pressurized via the purge inlet when the purge outlet valve is closed.

* * * * *